May 28, 1940.　　　L. E. LA BOMBARD　　　2,202,496
MACHINE FOR ADHESIVELY APPLYING AND SECURING COVERING MATERIAL TO ARTICLES
Filed March 17, 1939　　　17 Sheets-Sheet 3
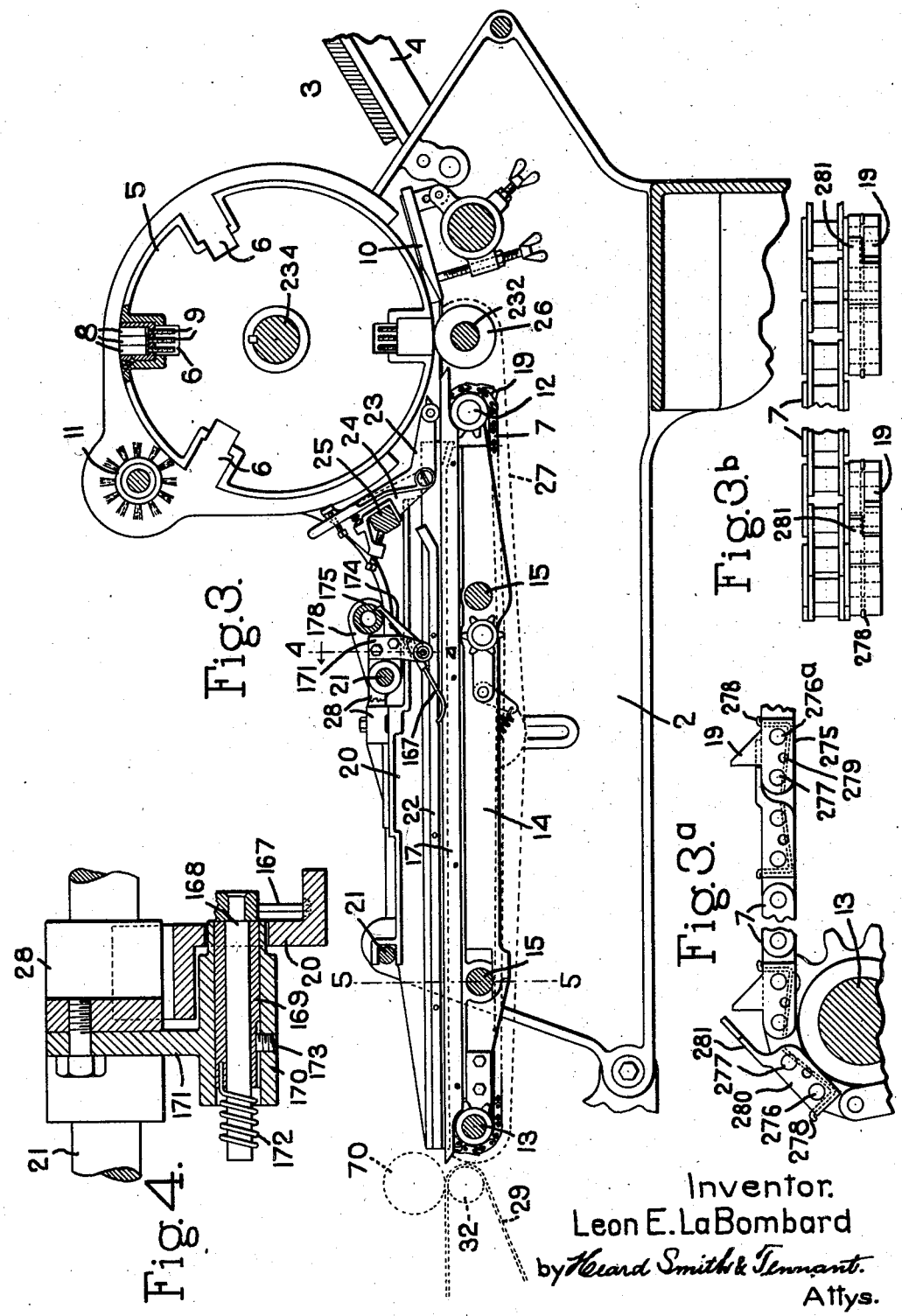
Inventor.
Leon E. LaBombard
by Heard, Smith & Tennant.
Attys.

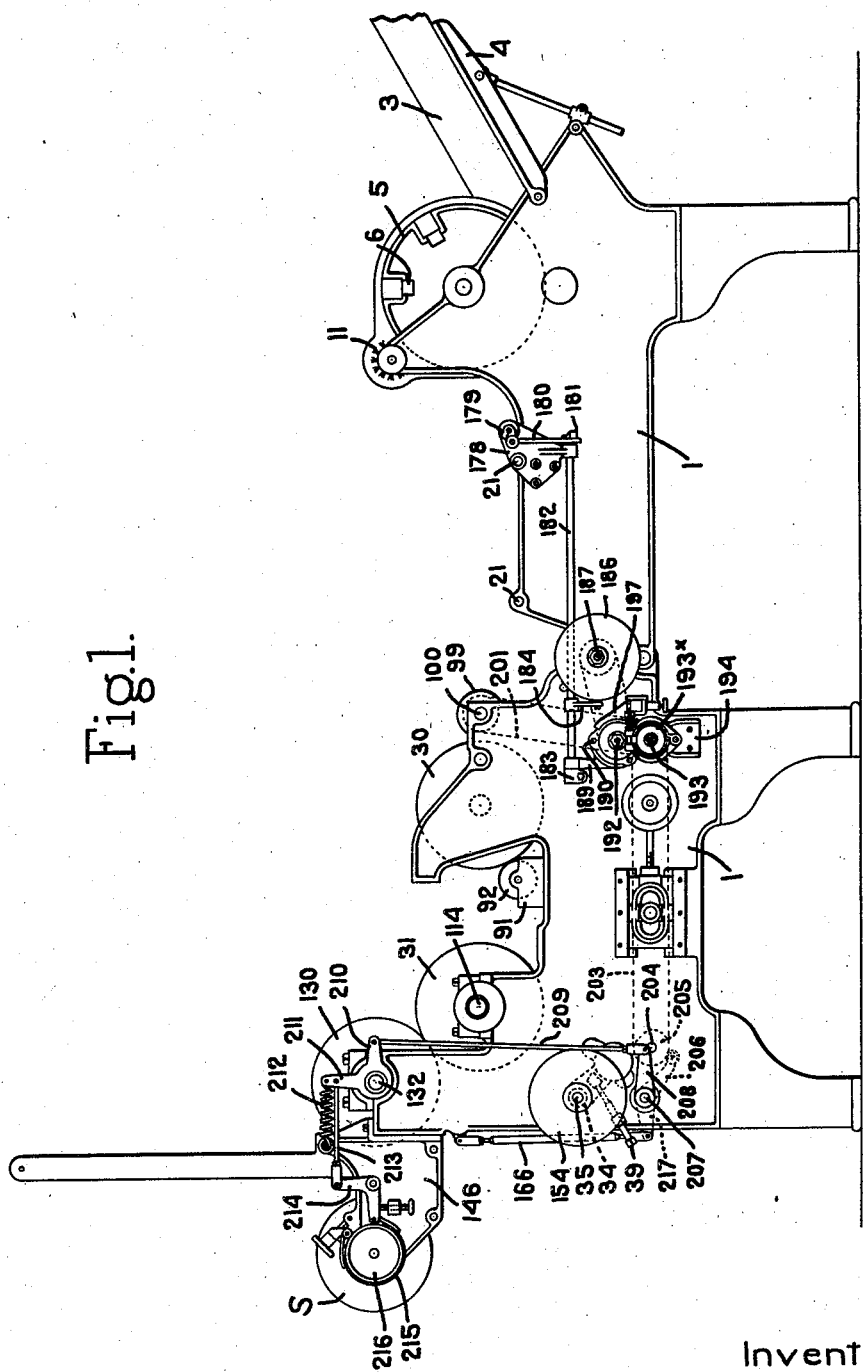

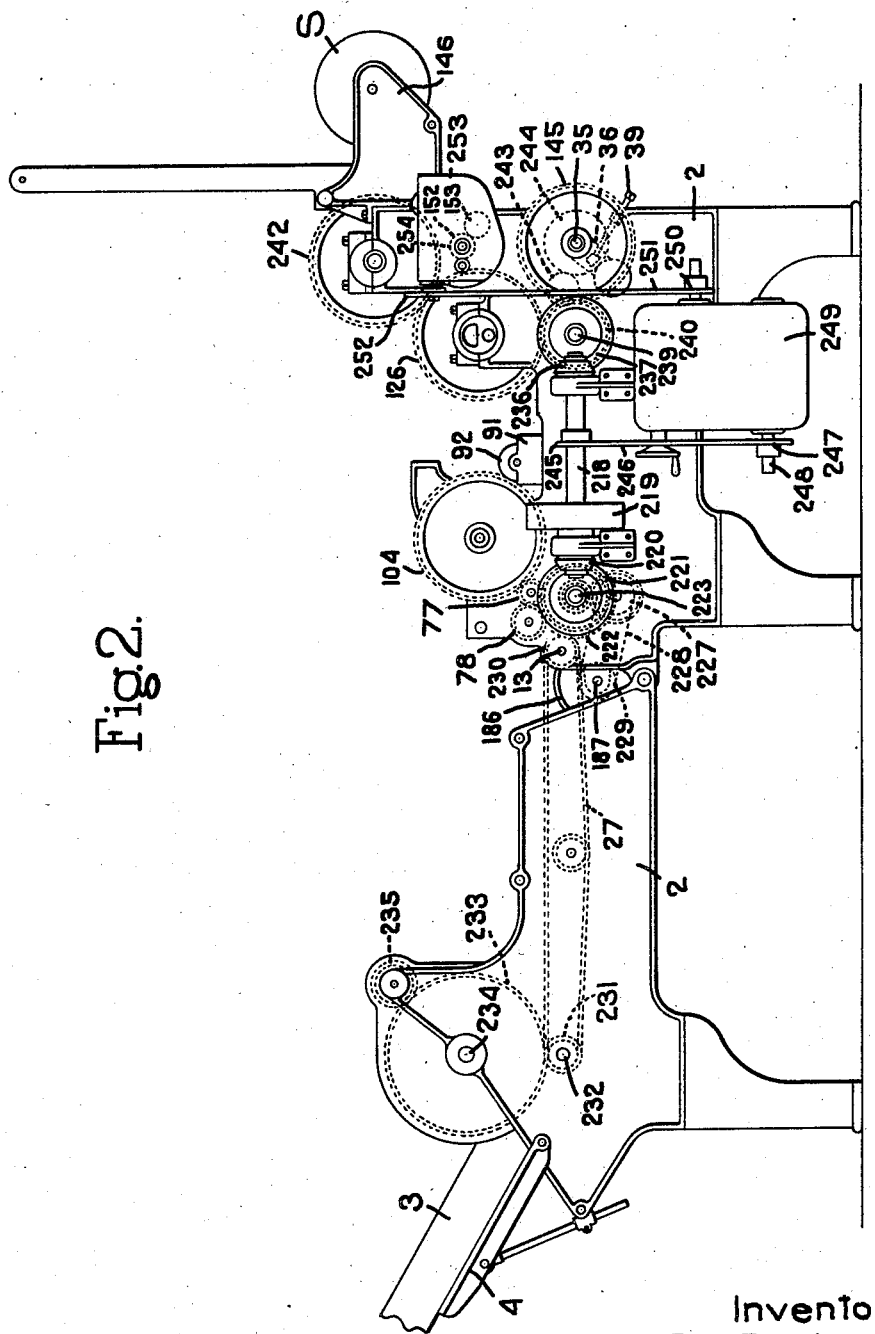

May 28, 1940. L. E. LA BOMBARD 2,202,496
MACHINE FOR ADHESIVELY APPLYING AND SECURING COVERING MATERIAL TO ARTICLES
Filed March 17, 1939    17 Sheets-Sheet 4
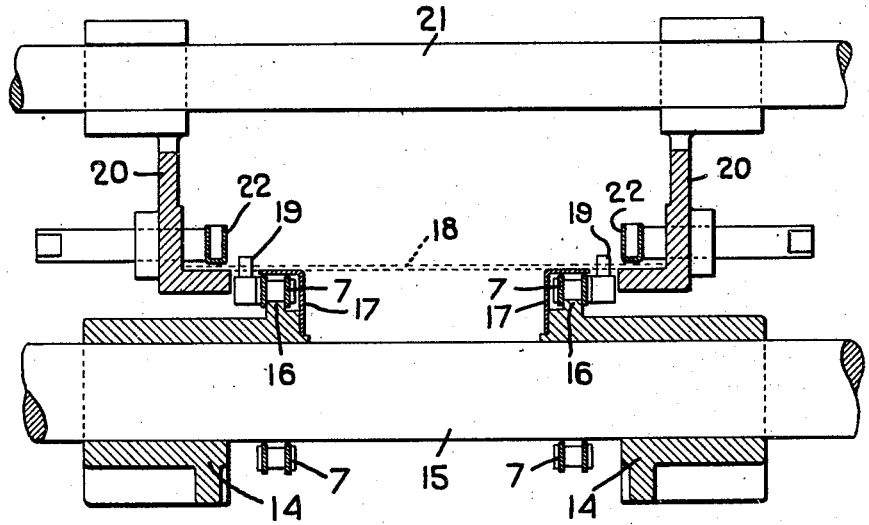
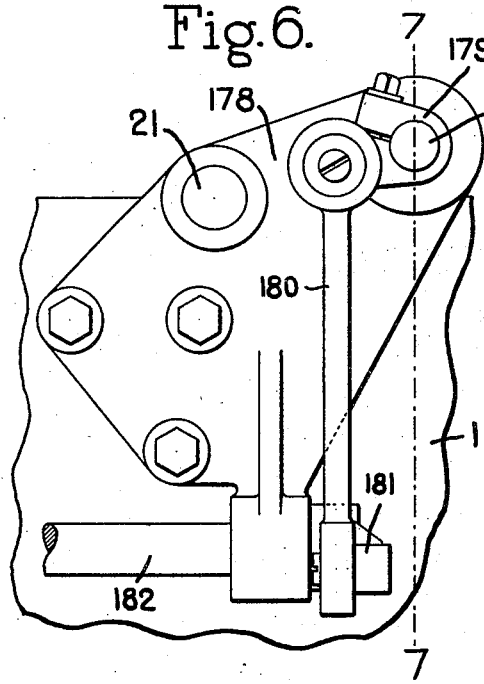
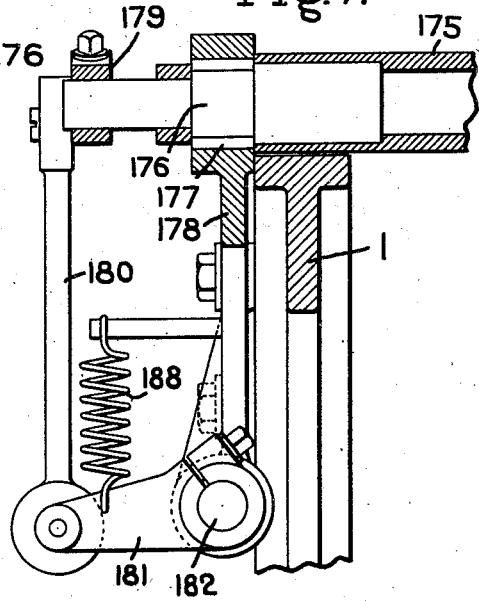
Inventor
Leon E. LaBombard
by Heard Smith & Tennant
Attys.

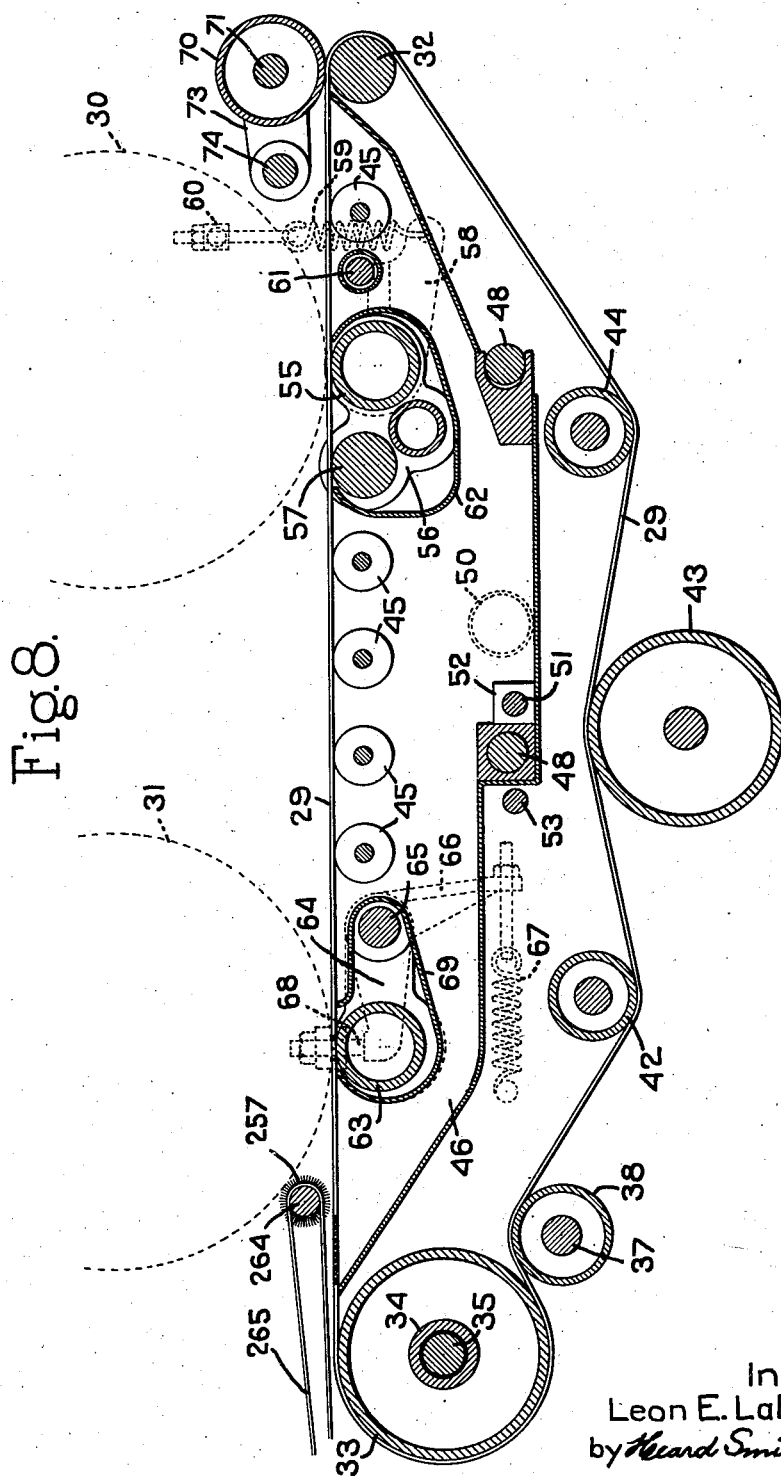

May 28, 1940.   L. E. LA BOMBARD   2,202,496
MACHINE FOR ADHESIVELY APPLYING AND SECURING COVERING MATERIAL TO ARTICLES
Filed March 17, 1939   17 Sheets-Sheet 6
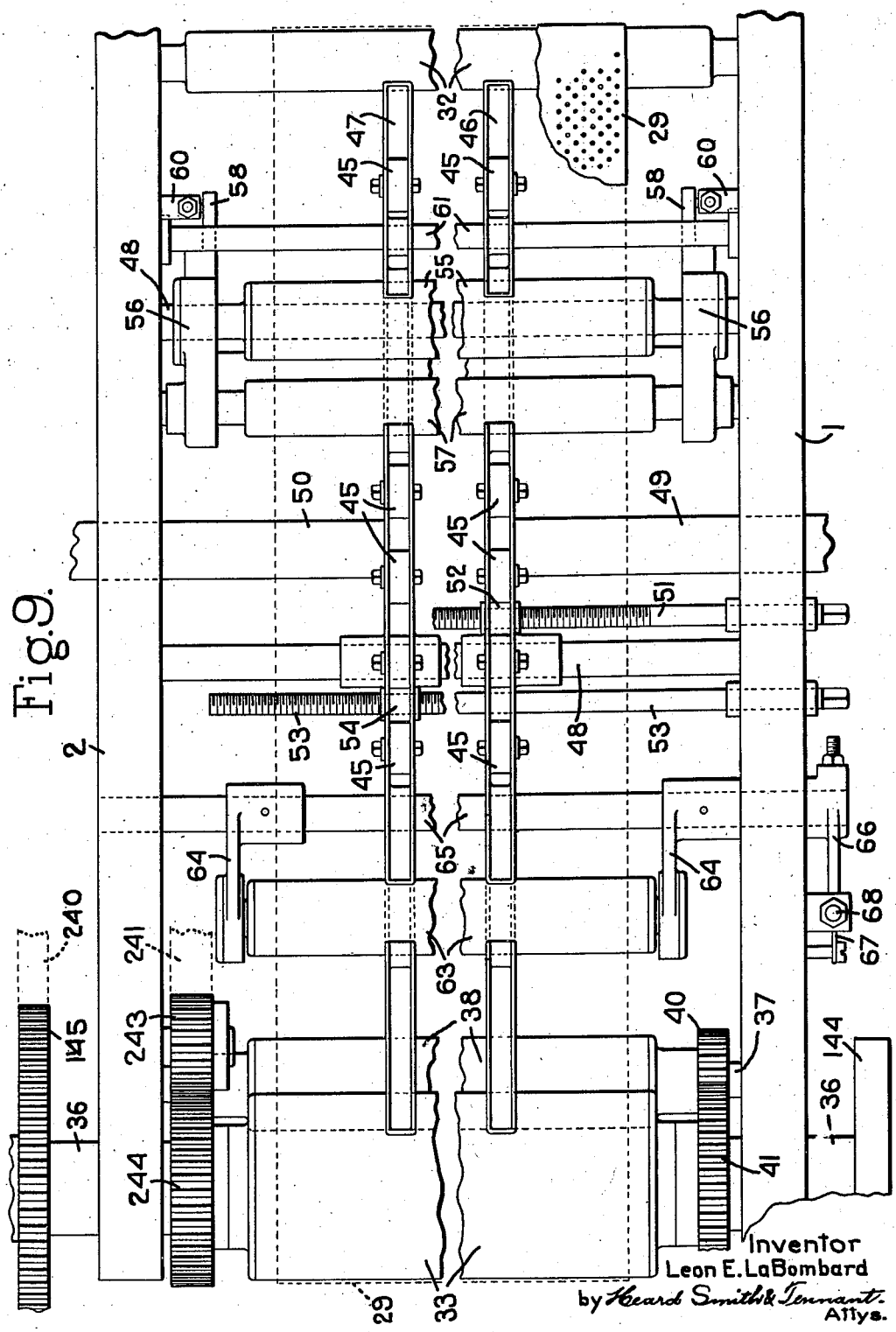
Inventor
Leon E. LaBombard
by Heard, Smith & Tennant
Attys.

May 28, 1940. L. E. LA BOMBARD 2,202,496
MACHINE FOR ADHESIVELY APPLYING AND SECURING COVERING MATERIAL TO ARTICLES
Filed March 17, 1939 17 Sheets-Sheet 7

Inventor.
Leon E. LaBombard
by Heard Smith & Tennant.
Attys.

May 28, 1940. L. E. LA BOMBARD 2,202,496
MACHINE FOR ADHESIVELY APPLYING AND SECURING COVERING MATERIAL TO ARTICLES
Filed March 17, 1939 17 Sheets-Sheet 10

Inventor.
Leon E. LaBombard
by Heard Smith & Tennant
Attys.

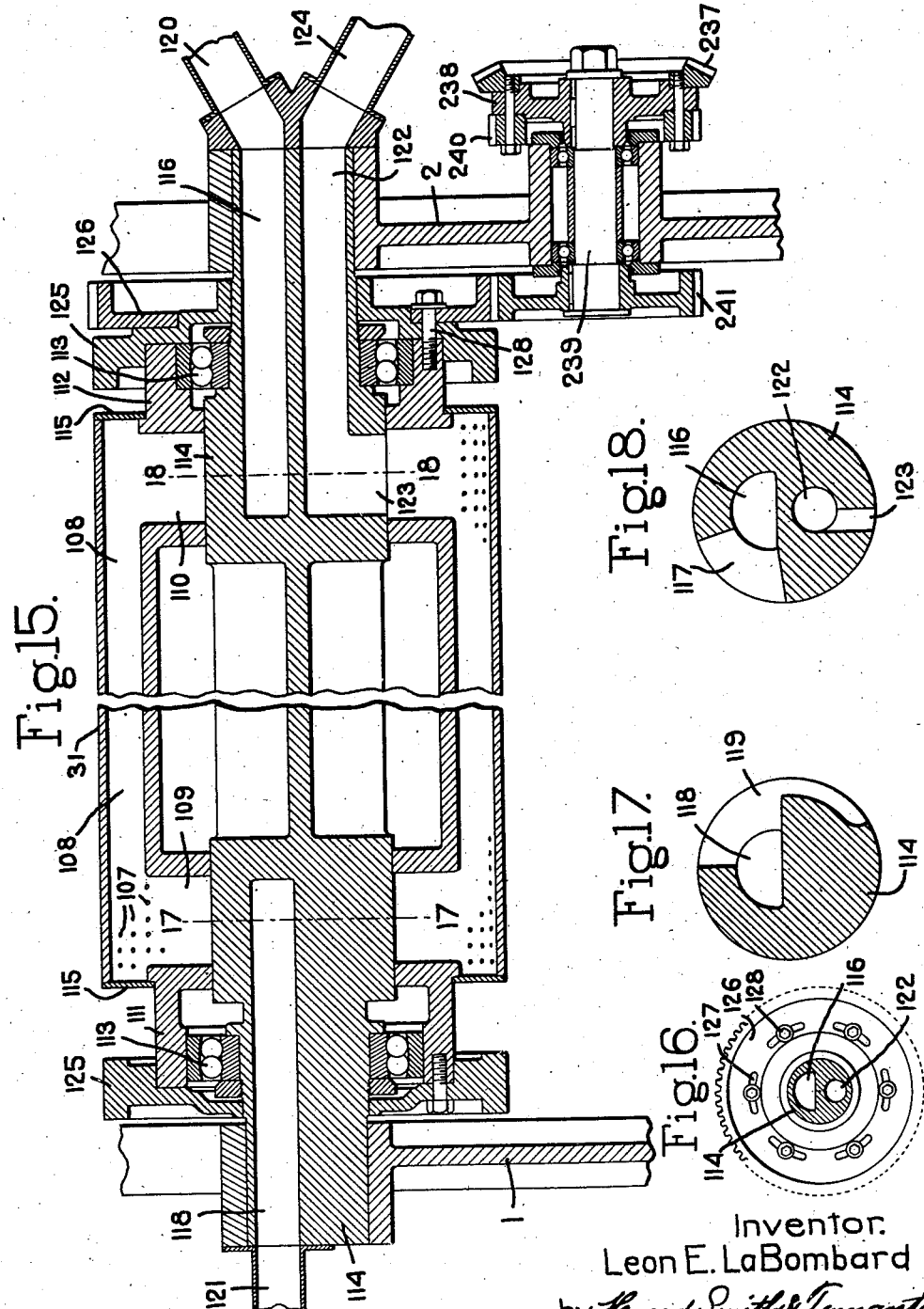

Inventor.
Leon E. LaBombard
by Heard Smith & Tennant.
Attys.

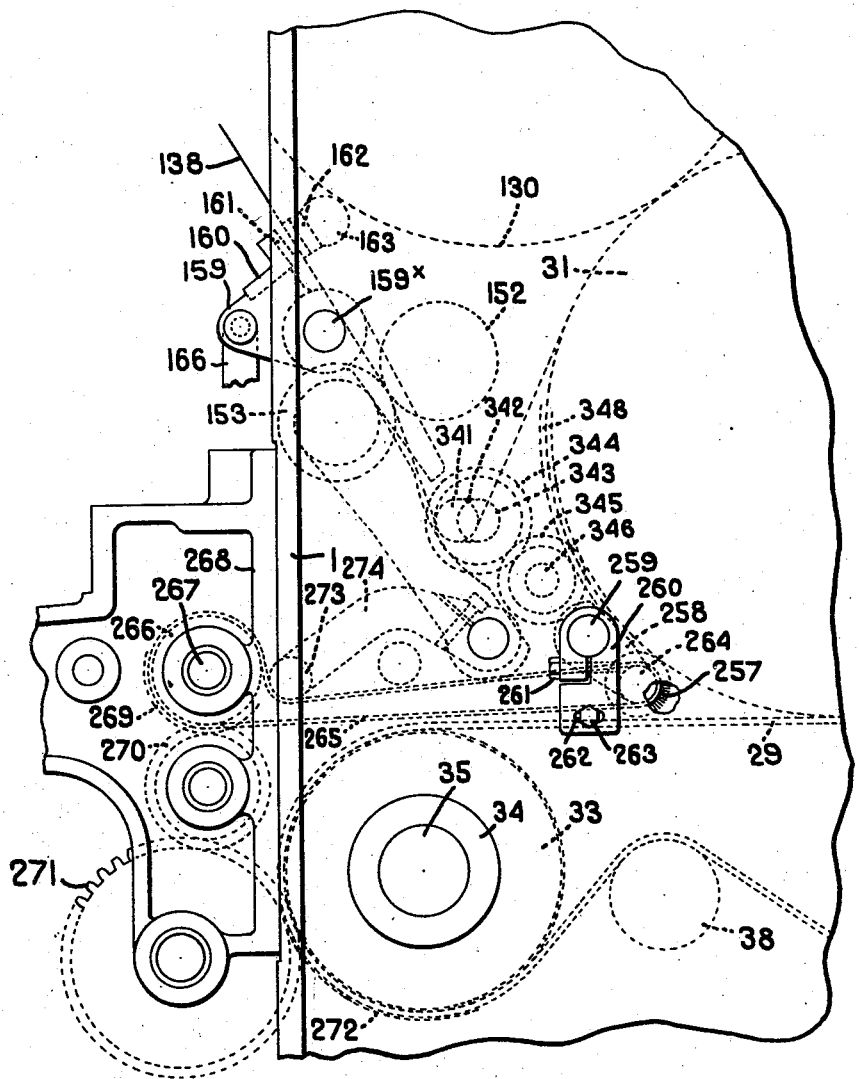

May 28, 1940. L. E. LA BOMBARD 2,202,496
MACHINE FOR ADHESIVELY APPLYING AND SECURING COVERING MATERIAL TO ARTICLES
Filed March 17, 1939 17 Sheets-Sheet 14
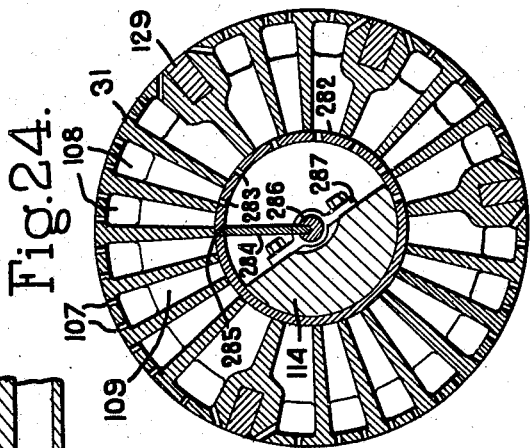
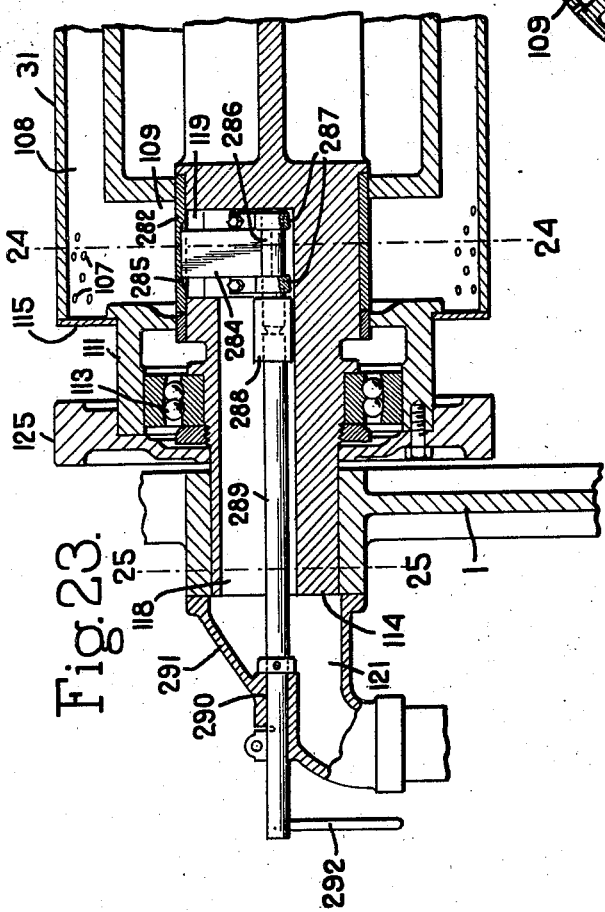
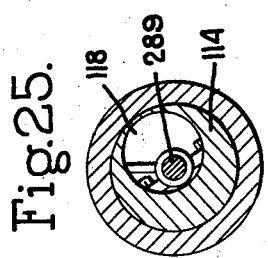
Inventor
Leon E. LaBombard
by Heard Smith & Tennant
Attys.

May 28, 1940.  L. E. LA BOMBARD  2,202,496
MACHINE FOR ADHESIVELY APPLYING AND SECURING COVERING MATERIAL TO ARTICLES
Filed March 17, 1939     17 Sheets—Sheet 15
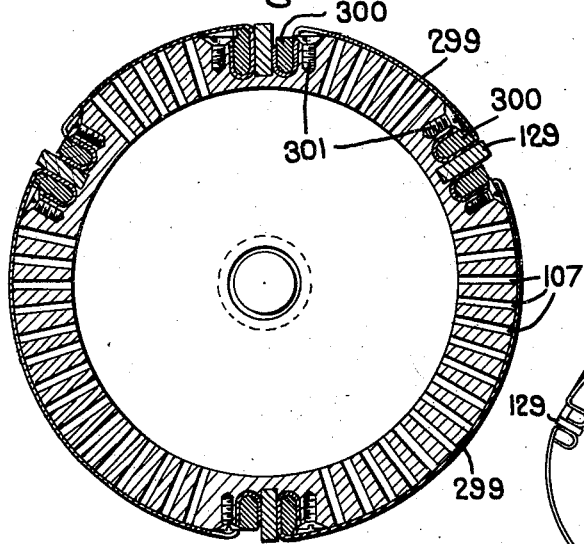
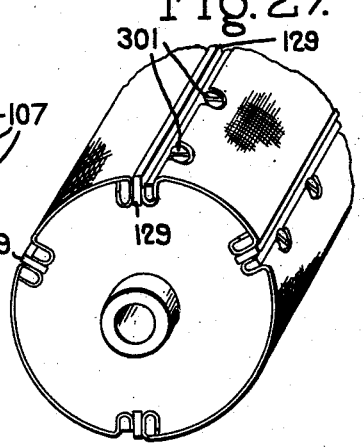
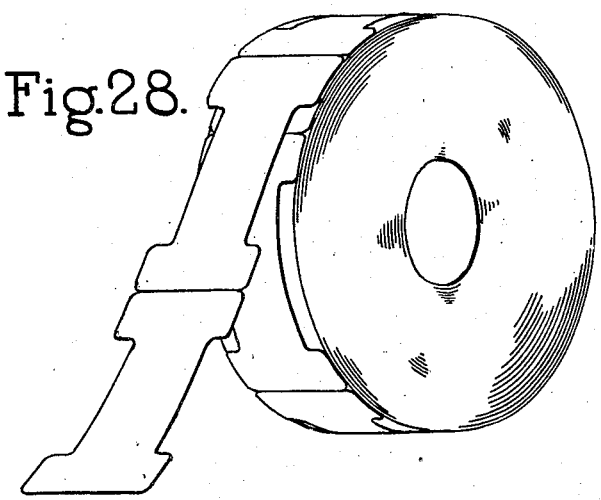
Inventor.
Leon E. LaBombard
by Heard Smith & Tennant
Attys.

May 28, 1940.  L. E. LA BOMBARD  2,202,496
MACHINE FOR ADHESIVELY APPLYING AND SECURING COVERING MATERIAL TO ARTICLES
Filed March 17, 1939  17 Sheets-Sheet 16
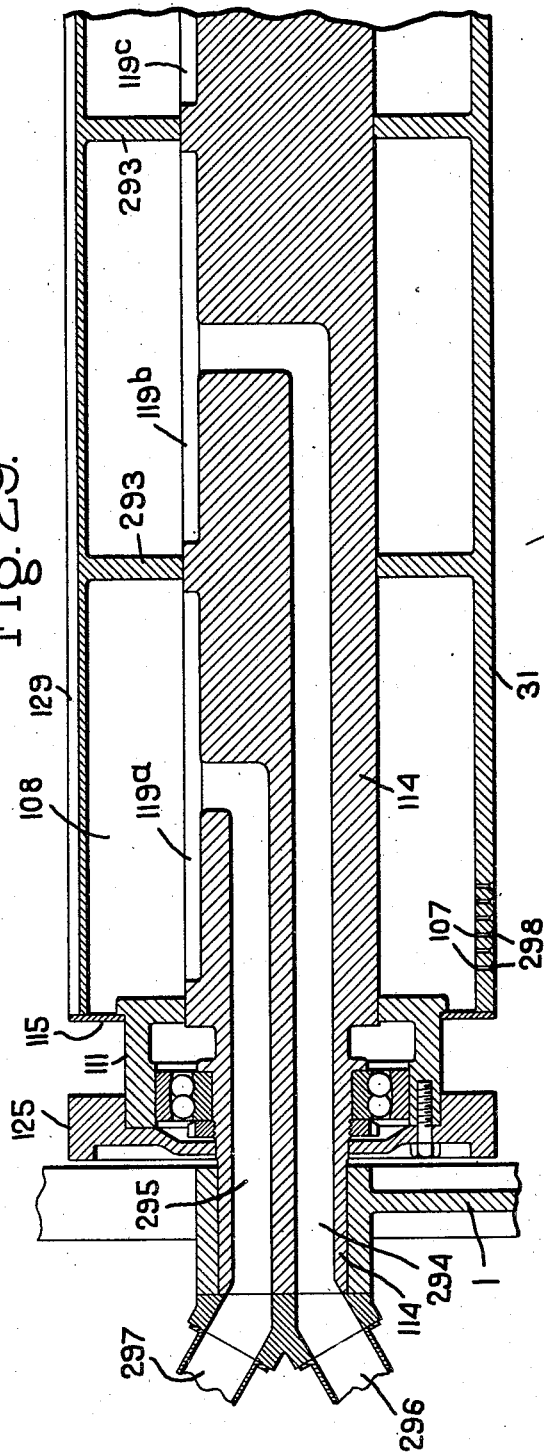
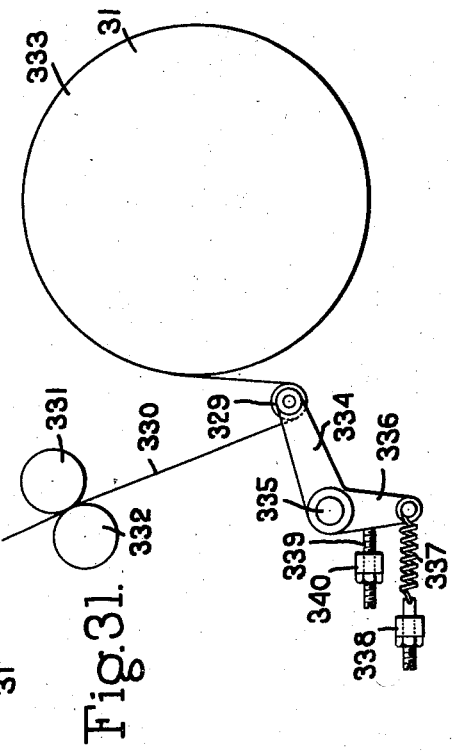
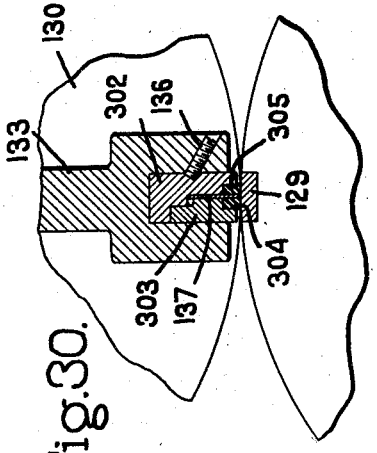
Inventor.
Leon E. LaBombard
by Heard Smith & Tennant
Attys.

May 28, 1940.  L. E. LA BOMBARD  2,202,496
MACHINE FOR ADHESIVELY APPLYING AND SECURING COVERING MATERIAL TO ARTICLES
Filed March 17, 1939   17 Sheets-Sheet 17

Inventor.
Leon E. LaBombard
by Heard Smith & Tennant
Attys.

Patented May 28, 1940

2,202,496

UNITED STATES PATENT OFFICE 2,202,496

MACHINE FOR ADHESIVELY APPLYING AND SECURING COVERING MATERIAL TO ARTICLES

Leon E. La Bombard, Nashua, N. H., assignor to The International Paper Box Machine Company, Nashua, N. H., a corporation of New Hampshire Application March 17, 1939, Serial No. 262,377

62 Claims. (Cl. 93—36)

This invention relates to improvements in machines for applying to a sheet of foundation material, or a plurality of foundation sheets or articles, overlaying material with predetermined sections thereof in accurate registry with complementary sections of the foundation material.

More particularly the invention relates to machines for applying overlaying sections of flexible material, such as Cellophane, or other preferably transparent material to adhesive-coated portions or areas of suitable foundation articles or material and in proper registry therewith, as for example, applying transparent windows to envelopes, paper or box-board blanks, such as are folded into cartons, etc.

A further object of the invention is to provide a machine adapted to sever sections from a web of previously printed flexible material which has been rolled and applying the severed sections to suitable foundation material in registry with predetermined areas of the foundation material, thereby to provide a printed overlaying layer or label for a carton or other container and in which certain areas or designs of printed material may overlay window openings in the container.

Another object of the invention is to provide a machine of the class described with means for more effectively handling thin covering material, such as Cellophane, in which a high charge of static electricity is built up by the feeding mechanism therefor.

Heretofore in machines for placing overlaying coverings, such as windows for envelopes, cartons, etc., the thin material is pushed through the cutting mechanism intermittently. Because of the static electricity produced in the thin material by the feeding mechanism the free end of the sheet will cling to anything with which it comes into contact, as for example, the free end of the material will tend to follow the feed roll if stripping means are not provided, and if provided the material will cling to the stripping means and to the knife itself, thereby causing great waste of material and time. To avoid this feature as much as possible manufacturers of thin material have gone to the expense of treating it in some manner to eliminate part of the static, but so far as I am aware no machine has heretofore been produced which is capable of satisfactorily feeding the thin material from a roll, cutting it into predetermined lengths with accuracy and uniting the sections thus severed in positive register with a predetermined area of a foundation material or article.

While untreated thin materials of a thickness less than .001" have been applied by hand, it has heretofore been found necessary for machine operation to treat the material for elimination of the static and even then to use heavier grades of material which will have sufficient stiffness to be pushed through the cutters or to the applying mechanism without adhering to the feeding mechanism or crinkling up when the static is severe.

One of the principal objects of the invention is to provide mechanism for utilizing the static electricity produced in the Cellophane or other thin material by the feeding mechanism to cause adherence of the free end of the web to a feeding, cutting, and applying means to produce such tension upon the web as will iron out the wrinkles and hold the end smooth and taut upon the cylinder prior to the cutting of a section from the web so that the static electricity thus generated will be helpful rather than detrimental to the operation of the machine.

A further object of the invention is to provide the feeding, cutting and applying means with a surface engaging the web of covering material which will minimize the production of static electricity where an excess of static would otherwise be produced by the friction between the feeding, cutting and applying means and the portion of the web engaged thereby, such means desirably being a covering of reticulated material, such as cotton cloth, fine screen wire, copper wire, etc.

Another object of the invention is to provide the cutting and applying means with means operable progressively to subject the web to suction before and preferably during and after it reaches cutting position to supplement the action of static electricity in ironing out the wrinkles or in ironing out wrinkles in material in which no substantial amount of static is produced.

A further object of the invention is to provide means for applying a blast of air progressively to the covering material when brought into registering position with the foundation material.

Another object of the invention is to provide a machine having means for feeding a foundation material or article and cooperating means for feeding and applying an overlaying section of covering material to a predetermined area thereof, with pneumatically operable means for causing the respective materials to adhere to their feeding means, and for insuring accurate registry of the section of covering material with said predetermined portion of the foundation material or article.

A further object of the invention is to provide adjustable suction means for holding the foundation material or article upon its feeding means.

A further object of the invention is to provide novel cutting means for the web of thin material in which the cutting means moves coincidently with the means for feeding the covering material and severs the sections therefrom by a pinching operation as distinguished from a shearing cut.

Another object of the invention is to provide means for continuously feeding the web of covering material at a uniform speed to a feeding and applying means moving at a relatively greater speed to provide slippage of the web thereupon, severing a predetermined section from the web, and moving the severed section to the position in which it is applied to a foundation material or article at a greater speed than that at which the web is fed to said feeding and applying means.

A further object of the invention is to provide means for progressively increasing the area of adherence of the web of covering material to the cutting, feeding and applying means so that a major portion of the area of a predetermined section severed from said web will be caused to adhere thereto at and after severance.

Another object of the invention is to provide a novel means for applying adhesive to the foundation material or article comprising a drum having a shell bearing a design for transferring adhesive to the article, with means for releasably attaching the shell to the drum, whereby changes in the pattern can be readily made by substitution of shells bearing other designs.

Another object of the invention is to provide a novel pick-off mechanism for progressively feeding sheets of foundation material from a stack or hopper to the mechanism for applying adhesive to the sheets and thence to the mechanism for applying a covering of thin material thereto.

Another object of the invention is to provide novel automatically operable means for removing the adhesive-applying means and the cutting means from operative position in the absence of a properly positioned foundation article upon the conveyer by which it is moved in operative relation to such mechanisms.

A further object of the invention is to provide controlling mechanism of the character described which will also arrest the feeding of the web of thin material and simultaneously apply a brake to the supply roll of said thin material.

Another object of the invention is to provide means for adjusting the feeding mechanism for the thin material while the machine is in operation.

Another object of the invention is to provide yieldable means operable upon the starting of the machine gradually to overcome the inertia of the supply roll of such thin material, thereby avoiding the imposition of a breaking strain upon the relatively thin material.

These and other objects and features of the invention will more fully appear from the following description and the accompanying drawings and will be particularly pointed out in the claims.

In the drawings:

Fig. 1 is a general side elevation of the machine illustrating the relative position of the magazine for superimposed series of foundation sheets or articles, the pick-off roll therefor, the mechanism for applying adhesive to the foundation material, and also illustrating the supply roll for thin overlaying material, means for severing a section from the web, and applying it to the adhesive-coated portion of the foundation material or article, and the automatic control mechanism operable to move the adhesive-applying roll and cutter from operative position and to arrest the rotation of the supply roll for the thin material;

Fig. 2 is a side elevation of the opposite side of the machine showing more particularly the power transmitting mechanism for the several parts;

Fig. 3 is an enlarged longitudinal sectional detail view of the pick-off mechanism and the conveyer for transporting the foundation material or articles to the feeding mechanism which carries said material through the field of operation of the adhesive-applying means and the means for applying the covering material to the adhesive-coated section of the material. It also illustrates a portion of the feeler mechanism for actuating the automatic controlling means;

Fig. 3—A is an enlarged detail side elevation of a portion of the conveyer chain for the foundation articles showing abutments which engage the rear edges of the articles and the means for insuring proper delivery of the articles from the conveyer;

Fig. 3—B is a plan view of the construction shown in Fig. 3—A;

Fig. 4 is a vertical sectional view on line 4—4 Fig. 3 of the feeler mechanism;

Fig. 5 is an enlarged vertical sectional view on line 5—5 Fig. 3;

Fig. 6 is an enlarged detail side elevation of one of the brackets secured to the side frame for supporting the forward end and the controller mechanism;

Fig. 7 is a vertical sectional view on line 7—7 Fig. 6;

Figure 10:
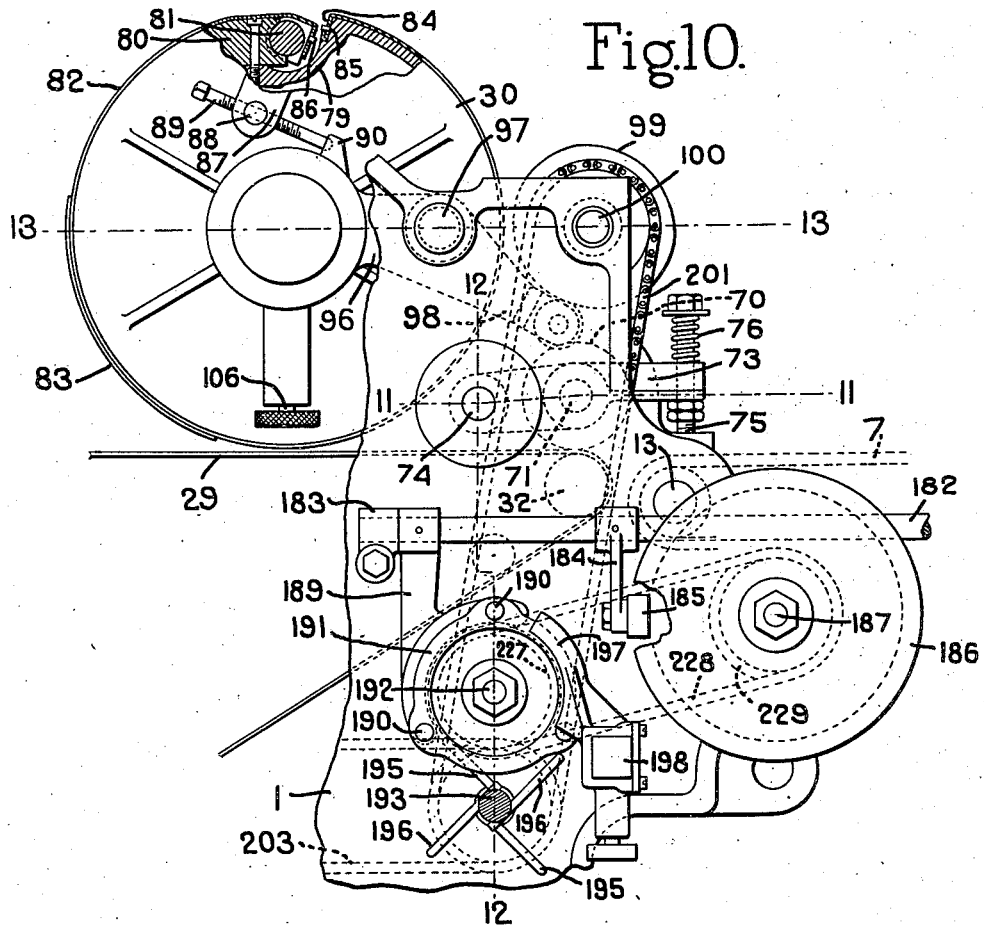
Figure 11:
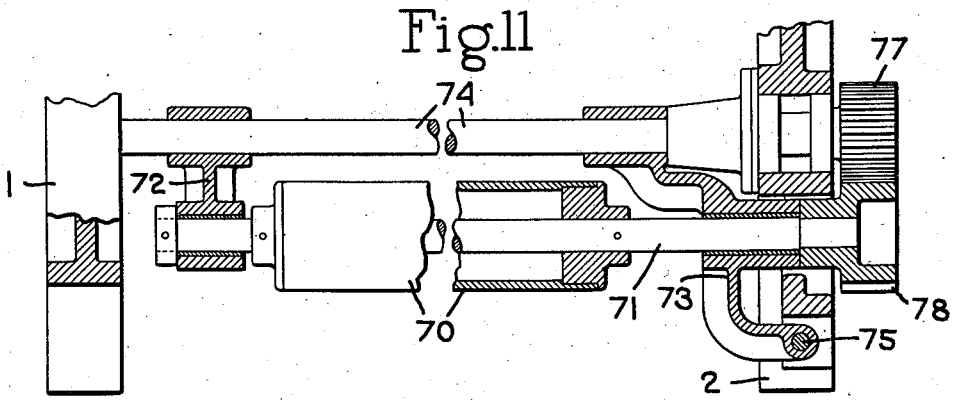
Figure 12:
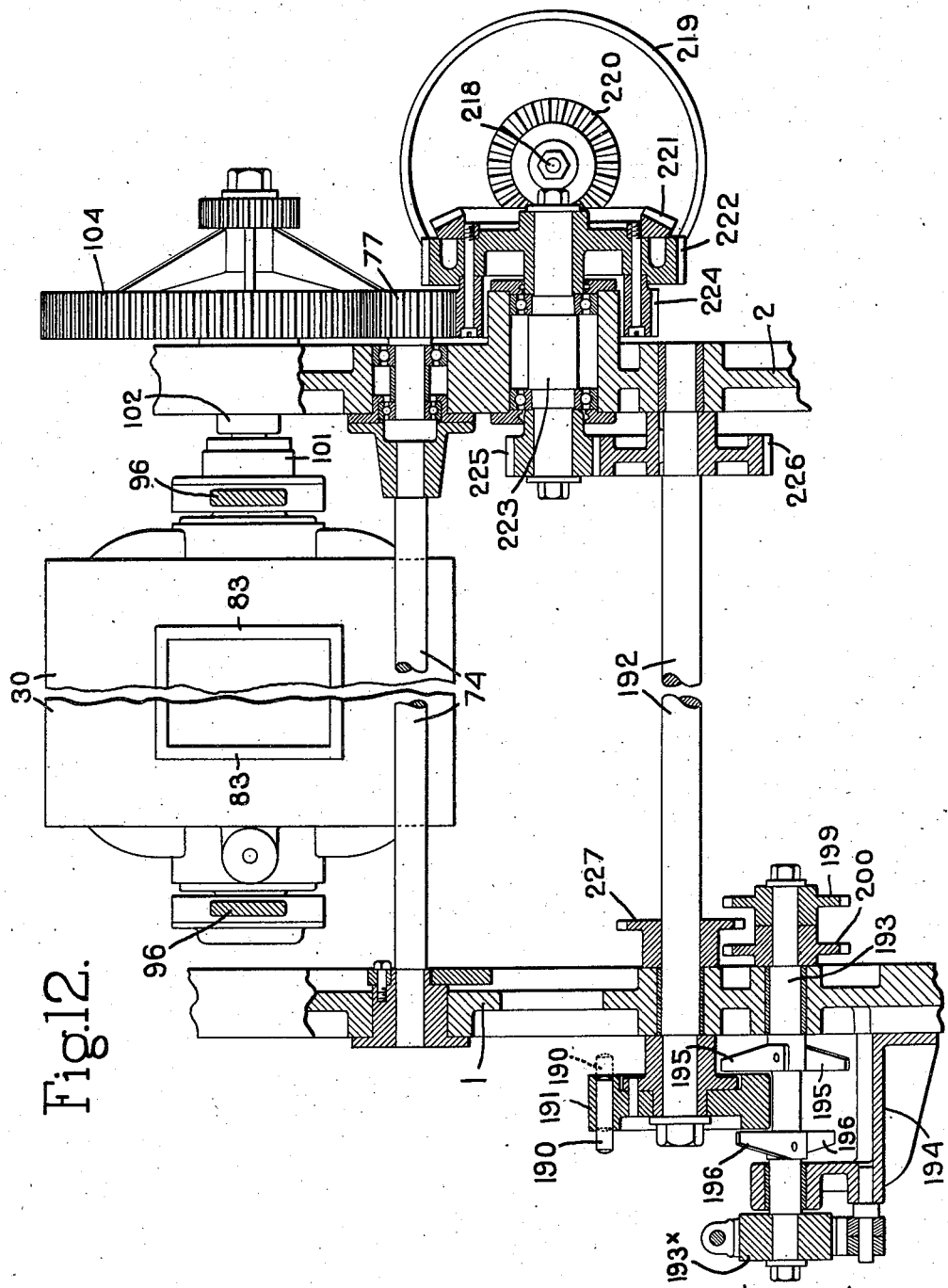
Figure 13:
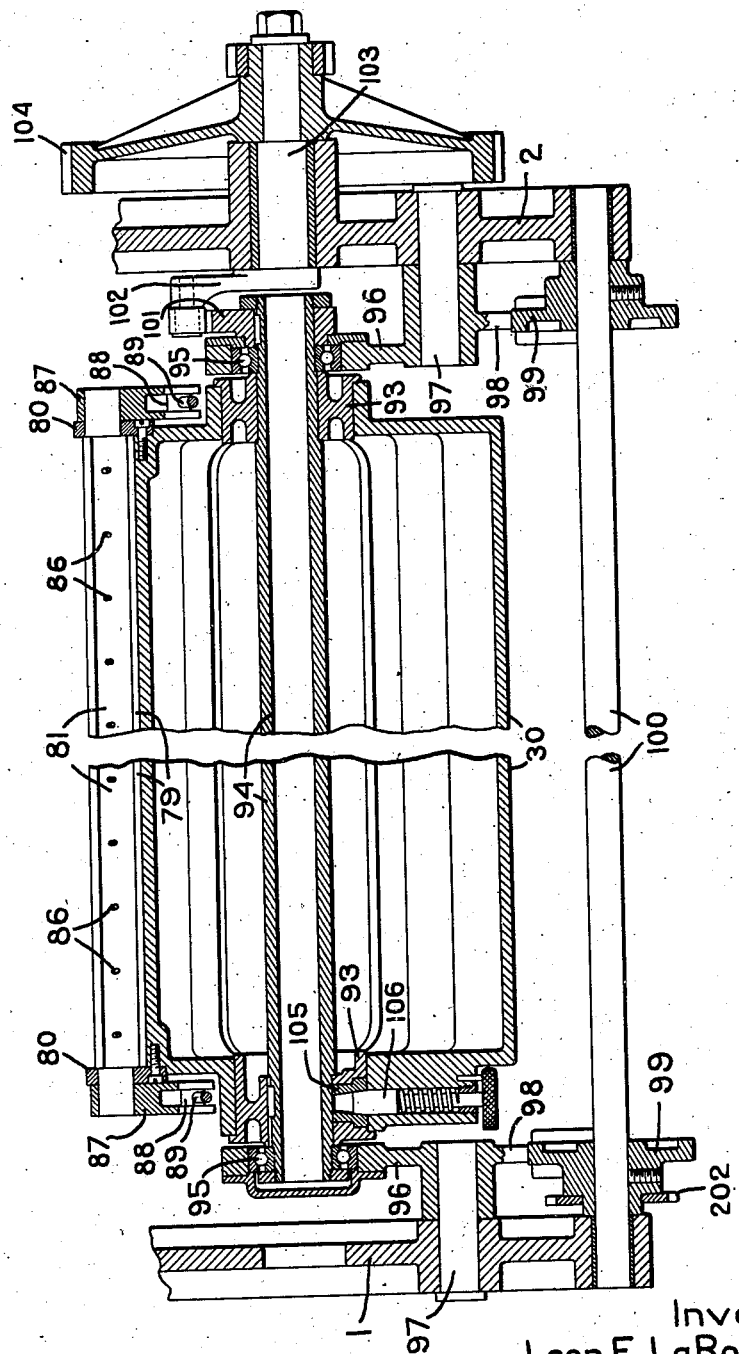
Figure 14:
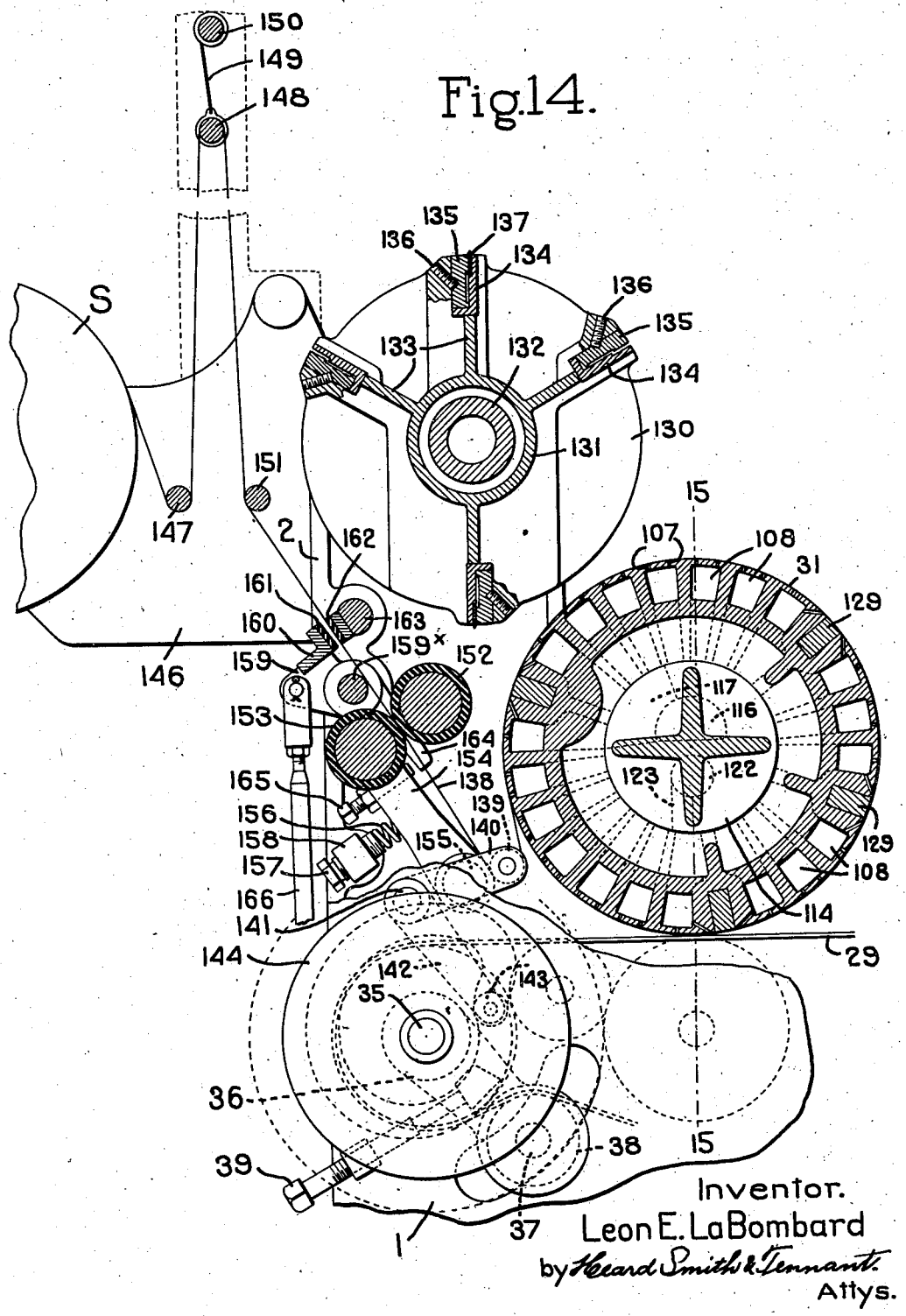
Figure 19:
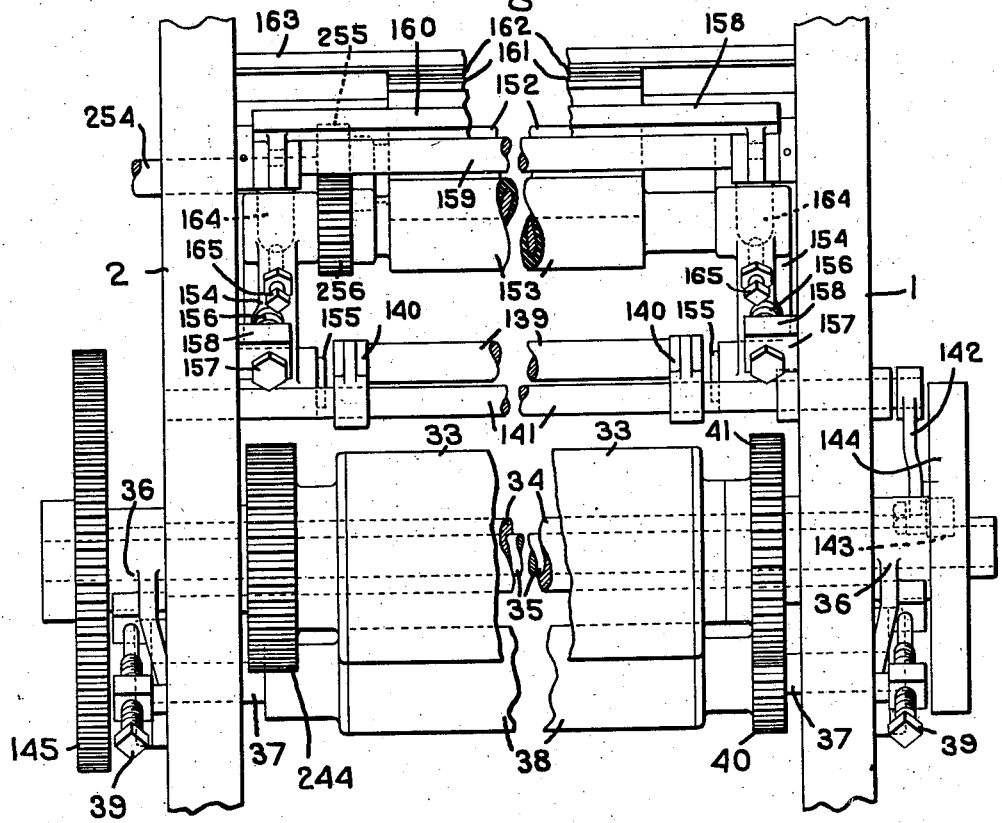
Figures 20, 21:
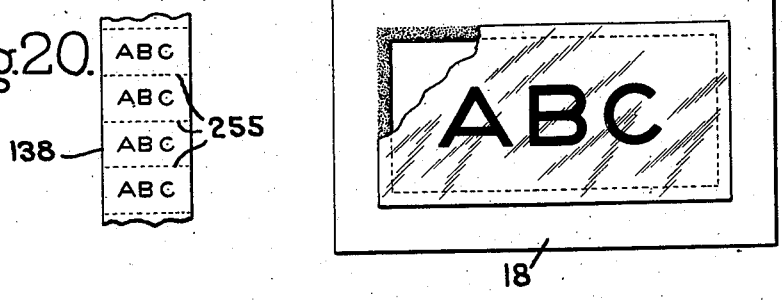
Figure 32:
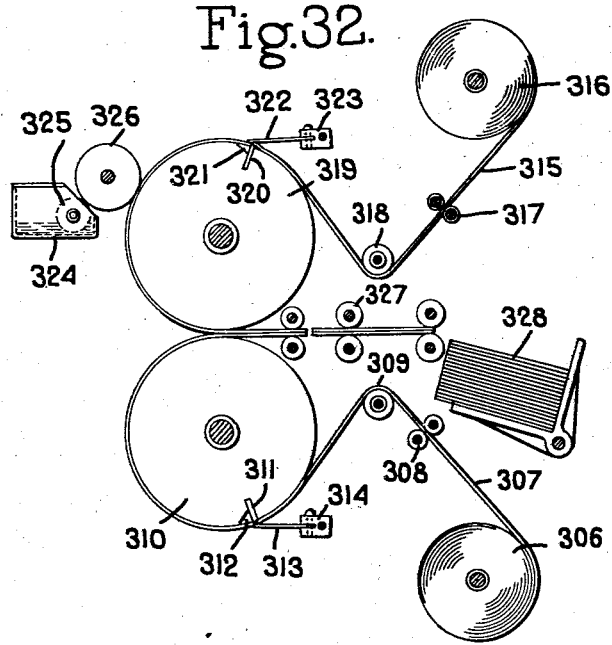
Figure 33:
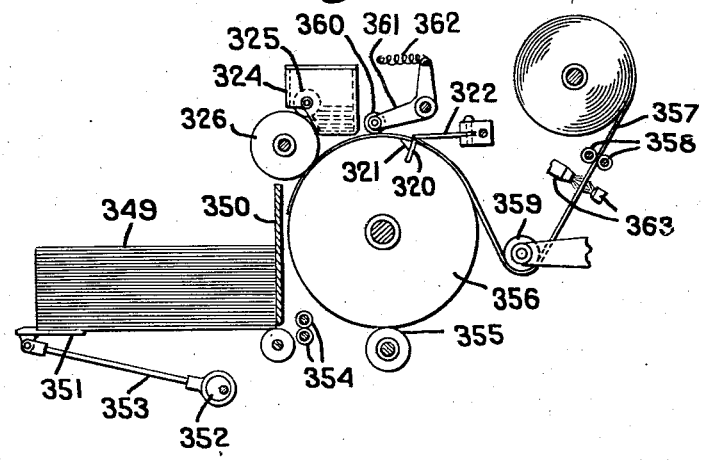

Fig. 8 is a longitudinal sectional view illustrating the perforated endless conveyer belt for carrying the base material or articles through the field of the adhesive-applying mechanism and the mechanism for applying a section of thin material to the adhesive-coated portion of the material, and showing in longitudinal section the box underlying the conveyer for retaining the article upon the conveyer;

Fig. 9 is a plan view of the same illustrating particularly a relatively adjustable pair of suction boxes;

Fig. 10 is a side elevation of the adhesive-applying drum, a portion of the same being broken away to show the detachable shell therefor and also illustrating certain parts of the controlling mechanism;

Fig. 11 is a horizontal sectional view on line 11—11 Fig. 10, illustrating particularly the mechanism for positively driving a feed roll cooperating with an endless conveyer for carrying the foundation material or articles through the field of the adhesive-applying drum and the mechanism for applying an overlaying layer to the adhesive-coated portion of said material or article;

Fig. 12 is a vertical sectional view on line 12—12 Fig. 10, illustrating more particularly the driving mechanism for the adhesive-applying roll and the automatically operable controlling mechanism for controlling the same;

Fig. 13 is a horizontal sectional view on line 13—13 Fig. 10, particularly illustrating the manner in which the adhesive-applying drum is mounted and automatically controlled, the drum having been turned a quarter revolution;

Fig. 14 is a side elevation of a portion of the frame and showing in section the means for cutting a section from a web of thin overlaying material and applying it to an adhesive-coated portion of a foundation material and also illustrating mechanism for continuously feeding said web to the cutting and applying mechanism and for clamping the web upon interruption of the feeding of said web;

Fig. 15 is a vertical sectional view on line 15—15 Fig. 14, illustrating particularly the air control and driving mechanism for the feeding, cutting and applying cylinder;

Fig. 16 is a detail end view of the adjustable mechanism for securing the cutting, feeding and applying cylinder to its driving gear;

Fig. 17 is a vertical sectional view on line 17—17 Fig. 15;

Fig. 18 is a vertical sectional view on line 18—18 Fig. 15;

Fig. 19 is a rear end elevation of a portion of the mechanism illustrated in Fig. 14;

Fig. 20 is a detail view of a web of thin covering material having predetermined printed sections of uniform width illustrating in dotted lines the position for severed ends of the successive sections;

Fig. 21 is an enlarged detail view illustrating one of the printed sections shown in Fig. 20 as applied to a window opening in the foundation article having an adhesive-coated border;

Fig. 22 is an enlarged detail side elevation of a portion of the delivery end of the machine shown in Fig. 14 and illustrating the brush mechanism for insuring delivery of the united materials from the feeding, cutting and applying roll, and also illustrating a modified form of let-off mechanism for the web of covering material;

Fig. 23 is a vertical sectional view of an end portion of the perforated feeding, cutting and applying cylinder, the valve mechanism for communicating with the chamber of the cylinder similar to the end portion of the construction illustrated in Fig. 15 but showing mechanism for controlling the points at which suction is applied through the cylinder to the web of covering material;

Fig. 24 is a vertical sectional view on line 24—24 Fig. 23;

Fig. 25 is a vertical sectional view on line 25—25 Fig. 23;

Fig. 26 is a vertical sectional view, mainly in diagrammatic form, illustrating a covering of reticulated material formed in sections and applied to the periphery of the feeding, cutting and applying cylinder for the purpose of reducing static created by the friction between the traveling web of covering material and the more rapid movement of the cylinder which is engaged by it;

Fig. 27 is a perspective view of the construction illustrated in Fig. 26;

Fig. 28 is a perspective view of a roll of suitable covering material provided with spaced recesses and registry lines particularly adapted to be used in connection with controlling mechanism including an electric eye for correlating the relative movements of the means for feeding the foundation material and the means for feeding and applying the covering material thereto;

Fig. 29 is a longitudinal sectional view similar to Fig. 15 illustrating a feeding, cutting and applying cylinder provided with a series of suction chambers longitudinally of its length and means for selectively applying suction to the respective chambers;

Fig. 30 is a detail sectional view of the cooperating members upon the feeding, cutting and applying cylinder and knife carrier and illustrating particularly resilient means located on opposite sides of the cutting blade adapted to engage and clamp the web of covering material upon the feeding, cutting and applying cylinder before and during the pinch-cutting operation;

Fig. 31 is a diagrammatic detail view of a modified form of let-off mechanism for the web of covering material from that shown in Fig. 14;

Fig. 32 is a diagrammatic illustration of an adaptation of the invention herein to the joining of superimposed sections of material each of which is severed from a traveling web thereof, and also illustrating a modified form of cutting mechanism for severing the web by a pinching action;

Fig. 33 is a diagrammatic view of an embodiment of the invention in a machine having intermittently operated means for presenting foundation articles to the means for feeding, cutting and applying a covering material thereto and also illustrating graphically an electric eye investigating the web of covering material and forming a part of the mechanism for maintaining proper synchronism of movement between the relatively movable mechanisms of the machine.

The machine illustrated in the accompanying drawings for applying an overlaying sheet or section of thin flexible material to the adhesive-coated portion or area of a suitable foundation material or article comprises in general means for successively feeding from a magazine a series of blanks, such as window envelopes, box-board blanks, or other suitable material to an endless conveyer which in turn delivers the articles in succession to a second perforated belt conveyer through which suction is applied. The perforated belt conveyer carries the articles beneath a drum by means of which adhesive is applied to a portion or the whole of the blank or article, and thence carries the article beneath a cylinder for cutting, feeding and applying a section of overlaying thin material to the adhesive-coated portion of the blank or article.

A supply roll of flexible covering or overlaying material, which may or may not have been previously printed, is supported at the opposite end of the machine, and means are provided for continuously and positively drawing the web of such material from the roll and feeding the same at a predetermined rate to the feeding and applying cylinder which is positively driven at a uniform but greater rate of speed than that at which the web is drawn from the supply roll thereby providing a slipping engagement between the web and the feeding and applying roll thereby to maintain a smoothing or ironing tension upon the web. The feeding and applying cylinder is provided with a cutting instrumentality which in cooperation with the knife or knives traveling at the same rate of speed as the cutting and applying mechanism severs sections of predetermined size from the web.

Suction means which is applied through the circumferential wall of the cylinder causes the section thus severed from the web to be positively held upon the surface of the cylinder until it approaches or reaches the position in which it is to be applied to the foundation blank or article which travels beneath the pinching and applying cylinder at the same rate of speed as the latter.

Suitable means are provided for projecting air under pressure through the perforated walls of the cylinder when the section of such material is in registry with the predetermined portion of the foundation material or article, thereby to insure accurate and positive registry of the overlaying section therewith.

The machine also includes automatic feeding mechanism operable upon detection of absence of a blank or article upon the conveyer of the pick-off mechanism to move the adhesive-applying drum and the knife which cooperates with the feeding and applying cylinder from operative position, and which also arrests the feeding mechanism for the web of covering material, and simultaneously applies a brake to the supply roll.

The machine also includes mechanisms for relieving the tension upon the web during the cutting operation and other mechanism for gradually overcoming the inertia of the feed roll upon starting of the feeding mechanism for the flexible material.

The general assemblage of the machine embodying the preferred form of the invention is illustrated in Figs. 1 and 2 of the drawings and comprises side frames 1 and 2, preferably formed in front and rear sections, the front section supporting the mechanism for feeding foundation articles to which the covering member is to be applied. The front section is provided with a forward extension 3 forming a magazine having an adjustable bottom 4 to receive the superimposed articles or blanks to which the thin covering material is to be applied. The picker cylinder 5 is mounted in suitable bearings in the side frame and is provided with preferably a plurality of recesses 6 in which are mounted frictional means for successively engaging the blanks and forwarding them to a suitable conveyer 7 (Fig. 3). The frictional means desirably comprises a plurality of juxtaposed plugs 8 of rubber, or other suitable material, contained in a suitable metallic block fixedly secured in the recess 6 and resting at their lower ends upon separate washers each of which is engaged by an adjustable screw 9 seated in the base of the metallic block. By reason of this construction each of the plugs may be so adjusted that its end will project a slight distance beyond the periphery of the picker cylinder. Desirably an adjustable support 10 which forms an extension of the bottom of the magazine is interposed between the magazine and the picker cylinder to insure proper presentation of the blanks to the picker wheel. A positively driven brush 11 suitably mounted on the frame serves to clean the picker cylinder thereby to insure proper engagement of the plugs with the successive blanks.

The conveyer 7 desirably is in the form of a pair of parallel endless sprocket chains which are mounted upon sprockets on shafts 12 and 13 which are journaled in a pair of sub-frames 14 which are mounted upon tie bars 15 extending through and fixedly secured to the side frames 1 and 2. The sub-frames are also provided with upwardly extending ribs 16 (Fig. 5) for guiding the sprocket chains and sheet metal covers 17 overlie the sprocket chains to support the blanks or articles 18 shown in dotted lines in Fig. 5.

The sprocket chains are provided with special link mechanisms which may be secured to the chain in proper positions to coordinate the delivery of the blanks to the mechanism for applying a covering thereto in properly timed relation. These supplemental links are adapted to be secured to the hinges of adjacent links and present abutments 19 adapted to engage the rear edge of the article with complementary links having tails to engage beneath the article as the chains pass around the sprocket wheels at the rear ends of the endless chain conveyer and thereby to raise the rear ends of the articles in such manner as to avoid bending of the articles or possible displacement from accurate coordination with the cover applying mechanism. This mechanism is illustrated in detail in Figs. 3—A and 3—B and will hereinafter be more fully described. Upper parallel sub-frames 20, which are mounted upon tie rods 21, are provided at their lower ends with integrally extending flanges which serve to support the edges of the blanks. The sub-frames are also provided with guides 22 which overlie the edges of the articles, as more particularly illustrated in Figs. 3 and 5.

A supplemental hold-down and guiding device 23, which is in the form of a lever, is pivotally mounted upon a bracket 24 which is adjustably secured to a cross bar 25. The front end of the lever is provided with a roller adapted to engage the articles forwarded by the pick-off. The opposite end of the lever is acted upon by a spring adapted to hold the roller in yielding engagement with the blank, while a stop screw is provided to limit the downward movement of the roll.

A roller 26, which is located directly beneath the shaft of the pick-off 5, is positively driven by a sprocket chain 27 forming a part of the main driving mechanism, as will hereinafter appear.

By reason of ths construction the articles are successively removed from the stack in the magazine by the pick-off roll and delivered to the sprocket chains in such manner that the abutments 19 on the sprocket chains will engage the rear edges of the articles and forward them with accuracy to the delivery end of the sprocket chains.

The upper supplemental frame is provided with a bracket 28 which has an extension upon which is mounted feeler mechanism adapted to detect the absence of a blank or article and to actuate suitable controlling mechanism, hereinafter to be described, to remove the adhesive-applying means and cutter for the thin web from operative position and also to actuate controlling mechanism for the web of thin material.

The blanks or articles are delivered from the endless conveyer chains 7 to a suitable conveyer for carrying them beneath the adhesive-applying mechanism and the mechanism for applying the sections of thin covering material to the adhesive-coated portions of the articles, and thereafter discharging the finished article. In the preferred construction illustrated herein the conveyers for the foundation articles comprise the suitably driven endless chains 7 and an endless belt 29 which support the foundation material and forward the same to the respective mechanisms for applying adhesive to foundation articles and to the means for applying a covering material to predetermined portions thereof. It will, however, be understood that other feeding or conveying mechanism may be employed and that the term "conveyer" is used herein in a broad sense as applying to any suitable means for forwarding or feeding the foundation material for the purposes herein set forth. The blanks or articles are delivered from the endless chain 7 to an endless perforated belt conveyer 29 which carries them through the field of operation of an adhesive-applying roll 30 and a cutting, feeding and applying cylinder 31 for applying the thin overlaying material to the adhesively-coated portion of the blank in accurate registry therewith and finally deliver the completed articles.

The endless perforated belt 29 is mounted at its front end upon an idle or guide roller 32 and at its rear end upon a positively driven roller 33 (Figs. 8 and 9), which is fixedly secured to a hollow shaft 34 and which is journaled in the side frames and which has extending through it a cam shaft 35 the function of which will hereinafter be described. The hollow shaft 34 extends through the side frames and has pivotally mounted upon it similar arms 36 (Figs. 1, 9, 14, and 19), in which is journaled a shaft 37 of a driving tension roll 38. Suitable adjusting screws 39 mounted in bosses in the side frames engage the arms 36 and serve to adjust the guide and tension roll to maintain proper tension upon the perforated belt 29. The tension and guide roll 38 is driven through a gear 40 on the tension roll 38 which meshes with a gear 41 on the hollow shaft. Other idlers 42, 43, 44, engage the lower lead of the perforated belt.

The upper lead of the perforated belt is maintained in horizontal position to prevent sagging by a series of suitably spaced idle rolls 45.

The blanks or articles which are carried by the upper lead of the perforated endless belt 29 are maintained in non-slipping contact therewith by suction mechanism located beneath the belt. Suction means may communicate with the entire lower surface of the belt, but preferably for purpose of economy and efficiency a pair of suction troughs, which are respectively adjustable laterally of the longitudinal axis of the machine, are provided to engage the articles in proximity to their lateral edges. Such suction means, which is illustrated in Figs. 8 and 9, comprises suction chambers in the form of a pair of narrow troughs 46 and 47 which extend longitudinally of the belt, and are slidably mounted upon cross bars 48. The troughs 46 and 47 communicate respectively with conduits 49 and 50 which lead to a suitable suction means (not shown). Lateral adjustment of the trough 46 is made by a screw 51 which is mounted in the side frame 1 and engages a suitable nut 52 which is fixedly secured in the lower part of the trough 46. The adjustment of the trough 47 is similarly made through a screw 53 engaging a similar nut 54 in the trough 47. In order to maintain proper positive engagement of the article with the adhesive-applying drum 30 means are provided for supporting the perforated endless belt immediately beneath the drum. As illustrated herein, Figs. 8 and 9, this mechanism comprises a preferably hollow roll 55 which is mounted in brackets 56 which are pivotally mounted upon the reduced end portions of a guide roll 57. The brackets 56 have forward extensions 58 which are yieldably supported by springs 59 adjustably supported from bosses 60 on the side frames. A tie rod 61 is so located as to be engaged by the extension 58 to limit the upward movement of the roll 55 and thereby prevent raising of the upper lead of the belt above horizontal position.

The mechanism thus described is enclosed in a casing 62 within the troughs to prevent breaking down of the vacuum. Similarly a pressure roll 63 is located below the belt in the vertical plane of the axis of the feeding and applying cylinder 31 for the web of thin material. The roll 63 is journaled in arms 64 (Fig. 9), which are secured to a shaft 65 which is rotatably mounted in the side frames and which has secured to it a bell crank lever 66 one end of which is acted upon by a spring 67 and the other arm of which engages an adjustable stop 68 mounted in a boss on the side frame, as illustrated in Fig. 9. Suitable casings 69 within the troughs enclose the roller 68 and the shaft 65 to prevent breaking down of the suction within the troughs. A suitable positively driven hold-down 70 engages blanks or articles as they are delivered from the endless chain conveyer to the perforated endless belt. This hold-down and driving roll 70 is fixedly secured to a shaft 71 which is mounted in bearings in the ends of arms 72 and 73 which are pivotally mounted upon a shaft 74. The arm 73 is provided with an extension which is engaged by an adjusting screw 75 which is mounted in a boss in the side frame and is provided with preferably a pair of check nuts which engage the lower end of the arm 73. A spring 76 is interposed between the upper face of the arm 73 and a suitable washer located beneath the head of the screw 75.

By reason of this construction the roll 70 is rotatably and yieldably held in engagement with the belt immediately above the guide roller 32. The driven shaft 74 is provided at one end with a gear 77 (Fig. 11) which meshes with a companion gear 78 on the shaft 71 of the hold-down and driving roll 70, thereby insuring proper and accurate delivery of the blanks or articles from the conveyer chains 7 to the perforated endless belt conveyer 29 which carries the blanks or articles beneath the adhesive-cutting, feeding and applying roll which applies the section of thin material to the adhesive-coated portion of the article.

The adhesive-applying roll 30 is in the form of a hollow metal cylinder having a longitudinally extending trough 79, to the ends of which are secured inset brackets 80 in which are journaled the ends of a bar 81 for removably clamping upon the cylinder a shell 82 which is provided with a raised area 83 of suitable material and of suitable design to receive and deposit adhesive upon the successive articles carried by the perforated belt 29. The shell 82, preferably, is of copper or other suitable material to receive an adhesive-applying material presenting a raised pattern surface of any desired contour. One end of the shell is provided with an inwardly bent flange 84 provided with a series of holes adapted detachably to engage a row of pins 85 projecting from the wall of the trough 79.

The opposite end of the shell is provided with a similar flange having a series of holes adapted to engage pins 86 which project from the flat face of the bar 81. Arms 87 are secured to the respective ends of the bar 81 and project inwardly and are provided with forked ends in which are rotatably mounted studs 88 having transverse screw-threaded bores. Locking and adjusting screws 89 are mounted in the screw threaded walls of the studs 88 and abut their ends against a boss 90 which projects upwardly from the hub of the cylinder 30.

By unscrewing the screws 89, the bar 81 may be rotated in a direction to enable the inwardly turned flange to be disengaged from the pins 86, thereby enabling the shell to expand sufficiently to permit disengagement of the flange 84 from the pins 85 and thus allowing the shell to be readily removed and replaced.

By reason of this construction, shells having different adhesive-applying patterns may be readily substituted, thereby effecting a considerable economy of time over usual construction in which the adhesive-applying pattern is secured directly upon the cylinder itself.

The adhesive is contained in a tank 91 having mounted in its upper end a partially submerged roll 92 which is so positioned as to engage the adhesive-applying pattern on the shell but not to engage the body of the shell (Fig. 1).

As is illustrated in Figs. 10, 12, and 13, the ends of the adhesive-applying roll are provided with tubular hubs which are rotatably mounted upon cylindrical bearing members 93, one of which is keyed to a hollow shaft 94 which is carried in ball bearings 95 in levers 96 which are pivotally mounted upon studs 97 extending inwardly from the main frames 1 and 2. The other arms 98 of the levers 96 are provided with follower rolls which engage cams 99 which are fixedly secured to a shaft 100 adapted to be actuated by control mechanism for raising the adhesive-applying cylinder out of operative position whenever an article is not being fed beneath it so that no adhesive will be applied to the perforated belt conveyer.

The hollow shaft 94 has secured to one end an arm 101 having a slotted outer end which is engaged by a roller which is mounted upon a stud projecting inwardly from an arm 102 which is fixedly secured to a shaft 103 which is provided with a driving gear 104, the gear 104 being driven by a mechanism hereinafter to be described.

In order to enable the adhesive-applying roll to be temporarily positioned for removal of the shell and restored to a normal position after another shell has been applied to it, means are provided for detachably securing one of the bearing blocks 93 to the cylinder.

As illustrated herein, one of the bearing blocks 93 (Fig. 13), is provided with a tapered socket 105 adapted to be engaged by a spring-actuated pin 106 having a knurled head and mounted in a boss extending from the end wall of the cylinder. The knurled head of the pin 106 is provided with a stud adapted when in locking position to enter a hole in the boss of the cylinder. When the pin is withdrawn against the pressure of the spring, it may be slightly rotated so that the end of the stud will engage the shoulder of the boss and retain the pin in withdrawn position, thereby to enable the cylinder to be rotated without disturbing the timing of the driving mechanism.

The endless perforated belt 29 carries the articles upon it successively beneath the adhesive-applying roll, and thence beneath a specially constructed cylinder for feeding, cutting, and applying a section of thin material upon and in registry with the adhesive-coated blank or article.

The feeding, cutting and applying cylinder 31 is illustrated particularly in Figs. 14 to 18 inclusive. The circumferential wall of the cylinder is provided with a series of perforations 107 which communicate with a series of chambers 108 which extend longitudinally of the cylinder and are provided with inwardly extending conduits 109 and 110 which communicate with valve mechanisms through certain of which the air is exhausted from the chambers 108 to cause the thin material to adhere to the cylinder, and also communicate with another passage in which air under pressure is introduced to detach the section of thin material from the cylinder when the section of thin material is in registry with the adhesive-coated portion of the blank or article.

The ends of the cylinder 31 are provided with cylindrical extensions 111 and 112 of relatively smaller diameter in which are seated ball bearings 113 which are mounted upon a stationary cylindrical valve member 114. Annular covers 115 are secured to the ends of the cylinder to close the chambers 108.

The valve members are so arranged as to apply suction through the perforations 107 to the web of thin material which is delivered to the feeding, cutting, and applying roll in advance of the cutting of sections therefrom and also to apply suction to the section thus severed from the web, and thereafter to discontinue the action of suction upon said section and project air under pressure through the perforations in the cylinder when the section of thin material is in registry with the adhesive-coated portion of the article. In order to accomplish this purpose, the valve member 114 is provided at one end with a longitudinal bore 116 which communicates with a port 117 which is adapted to communicate with the chambers 108 as the passages in the cylinder are rotated towards cutting position.

The opposite end of the valve 114 is similarly provided with a longitudinal bore 118 having a circumferentially broader port 119 which communicates with the chambers 108 after they pass cutting position and until they approach closely to the position in which the section of thin material is in registry with the adhesive-coated portion of the article. Suitable conduits 120 and 121 are provided for applying suction through the bores 116 and 118 and ports 117 and 119 to the chambers 108.

The same end of the member 114 as that containing bore 116 is provided with another bore 122 having a port 123 adapted to communicate with the chambers 108 when the section of thin material is in registry with the adhesive-coated portion of the article and the bore 122 communicates with a suitable conduit 124 through which air under pressure is supplied. The cylindrical extensions 111 and 112 have secured to them cover members 125, to one of which is adjustably secured a gear 126. The web of the gear 126 is provided with a series of slots 127 which are concentric with respect to the axis of the gear, and the gear is adjustably secured to the end of the cylinder by a series of bolts 128 which pass through the slots 127 as illustrated in Figs. 15 and 16. By reason of this construction, accuracy in assembling the mechanism in properly timed relation to the movement of the successive articles may be readily secured.

In usual machines for securing a section of thin material such as Cellophane to predetermined adhesive-coated portions of foundation material such as a window envelope, window with a cardboard container, and the like, the Cellophane or other thin material has been fed intermittently to cutting mechanism, and the static electricity generated in handling such thin material often causes it to stick to the feeding mechanism or the cutter, thereby preventing the use of very thin material of one-thousandth inch or less thickness.

One of the principal objects of the present invention is to provide cutting means which will properly sever sections of the thinnest material without difficulty. In the present invention this is accomplished by providing cooperating cutting members upon the feeding cylinder and another member moving at the same speed as the peripheral speed of the cylinder.

In the preferred construction illustrated here, the cylinder 31 is provided with a plurality of radial recesses, desirably of rectangular cross section, in which are seated hard steel cutting blocks 129, the outer ends of which form continuations of the periphery of the cylinder. As illustrated, four of such blocks are provided and suitably spaced to enable one, two, or three sections selectively to be severed from the web at each rotation of the cylinder.

The cooperating cutting member comprises a cutter-carrier having circular heads 130 which are fixedly connected to a cylindrical spacing member 131 which surrounds and is fixedly secured to a concentric shaft 132 which is journaled in upward extensions of the main frame. The cylindrical spacing member is provided with a plurality of integral radial webs 133 which are so spaced as to correspond with the cutting blocks in the cylinder. At each end of the webs 133, the heads are provided with radial recesses which receive L shaped blocks 134 and complementary clamping blocks 135 which are held in place and forced together by set screws 136. The cutting blades 137 which are of very thin material and ground to a sharp edge are firmly held between the cooperating blocks 134 and 135 and are so positioned as to contact with the cutting blocks 129 of the cylinder, thereby to give a pinching cut to sever sections from the web of the material. The cutting blades 137 extend at a very slight angle to the longitudinal axis of the cutter-carrier member so that the blades 137 contact with the blocks 139 progressively lengthwise of the cylinder, thereby avoiding the shock which would result if the blade contacted with the block throughout its entire length simultaneously.

Suitable gears upon the shaft of the cylinder 31 and the cutter-carrier cause the cutter-carrier and the cylinder to rotate at the same peripheral speed.

A further important object of the present invention is to provide means for continuously feeding a web of thin material such as Cellophane from the supply roll to the cutting, feeding, and applying cylinder at a slower rate of speed than the peripheral speed of the cutting, feeding, and applying cylinder, thereby to maintain a smoothing or ironing tension upon the web which will insure smooth application of the web to the cylinder until it is cut.

In machines which have been previously constructed, the static electricity which is generated by the feeding mechanism has been detrimental to proper severence of sections from the web. In the present invention, the static electricity is utilized to cause adherence of the web to the cutting, feeding, and applying cylinder, and instead of being detrimental, is of aid in properly feeding and smoothing the thin material.

It has heretofore been shown that the application of suction through the suction chambers 108 is such that suction is applied to the chambers in advance of the cutting blocks 129 so that by reason of the adhesion of the web to the periphery of the cylinder caused by the static electricity and the suction thus applied, the web is held firmly upon the cylinder at the cutting position. It has also been shown that suction is applied through the suction chambers 108 to the section of the thin material immediately after it has been severed from the web, and that said suction is maintained until the section approaches registry with the adhesive-coated portion of the article to which it is to be applied. By reason of the fact that the peripheral speed of the cylinder is greater than the rate of movement at which the web is fed to the cylinder, the section which is severed from the web will be carried to applying position at a considerably greater rate of speed than that at which the web is fed, it being understood of course that the peripheral speed of the cylinder is exactly the same as that of the perforated belt conveyer upon which the articles are carried beneath the feeding, cutting, and applying cylinder.

By reason of the difference in the speed of the cylinder and the rate at which the web of thin material is continuously delivered to the cylinder, it is essential that means be provided to compensate for the different rates of speed in order to prevent undue tension upon the web at the time of cutting, or, in other words, to provide means which will enable the web to attain approximately the same rate of speed as the circumferential speed of the cutting, feeding, and applying cylinder.

In the preferred embodiment of the invention illustrated, the web 138 of cellophane or other material is continuously delivered at a predetermined rate from a suitable feeding mechanism hereinafter to be described from which it is led around a roller 139 into contact with the periphery of the cutting, feeding, and applying cylinder 31.

The shaft of the roller 139 is journaled in a pair of arms 140 (Figs. 14 and 19) which are fixedly secured to a shaft 141 which is journaled in the main side frames 1 and 2 and extends at one end beyond the main side frame 1 and is provided with another arm 142 having upon its other end a follower roll 143 which engages a cam 144 which is fixedly secured to the shaft 35 which extends through the hollow shaft 34 upon which one of the cylinders of the perforated belt conveyer is mounted.

The opposite end of the shaft 35 has secured to it a gear 145 which is driven through a suitable train of gears, hereinafter described, in timed relation to the rotation of the feeding, cutting, and applying cylinder and the cutter carrier. The cam is so designed that as the web of material closely approaches cutting position, the roller 139 around which the web extends is raised rather abruptly to free the tension upon the web as it is being cut, thereby providing sufficient slack to avoid tearing of the web.

After the section has been severed from the web, the free end of the web will be caused to adhere to the periphery of the cylinder by virtue of the static electricity until the web is more firmly held in contact with the periphery of the cylinder by the suction means heretofore described. After the section has been severed from the web, the cam 144 gradually restores the arm 140 and its roller 139 to normal position.

Any suitable means may be provided for feeding the web of the covering material to the cutting, feeding, and applying cylinder at a predetermined constant and continuous or intermittent rate.

As illustrated herein, a supply roll "S" of Cellophane or other covering material is mounted upon extensions 146 of the main side frames 1 and 2. The web 138 of covering material is led from the roll downwardly beneath a guide roll 147; thence upwardly over a take-up roll 148 which is yieldably supported by flexible cords 149 which are coiled about a shaft 150 which is acted upon by a spring (not shown) in a manner similar to that of a shade roll. The take-up roll 148 is therefore normally held in upward position as illustrated in Fig. 14.

The web 138 is led downwardly from the take-up roll 148 along a guide rod 151, and thence between a pair of rubber covered feed rolls 152 and 153 which are driven at the same constant, predetermined speed. Means, hereinafter to be described, are provided for adjusting the speed of the feed rolls in properly timed relation to the feeding, cutting and applying cylinder and the cooperating cutting means.

If during the operation of the machine, absence of an article to which a section of covering material is to be applied is detected by mechanism hereinafter to be described, means are provided for separating the feed rolls 152 and 153 to arrest further movement of the web, and other mechanism is actuated to clamp the web until proper operation of the machine is resumed.

In the preferred construction shown, the feed roll 152 is rotatably journaled in the main side frames 1 and 2. The companion roll 153 is journaled in bearings in the ends of arms 154 which are pivotally mounted on studs 155 projecting inwardly from the main frame as illustrated in Fig. 19. The feed roller 153 is normally yieldably maintained in engagement with feed roll 152 by springs 156, the ends of which engage the arms 154, and the opposite ends of which engage screws 157, which are mounted in bosses 158 projecting inwardly from the main side frames 1 and 2.

The means for separating the feed rolls 152 and 153 and for clamping the web upon detection of the absence of an article from the conveyer comprises a frame 159 which is pivotally mounted upon a rod 159$^x$, the ends of which are mounted in the main side frames 1 and 2 and which is provided with an integral transverse L shaped connecting bar 160 having a rubber face 161 adapted to engage the under side of the web 138 of thin material and clamp it against a companion rubber face 162 which is secured to a rod 163, the ends of which are mounted in the main side frames 1 and 2. The frame 158 is provided at each end with an extension or tailpiece 164 adapted when the frame is rotated about its pivot 159 to engage the ends of the screws 165 which are adjustably secured in the arms 154.

The frame 158 is rotated in the manner above-described to a clamping position by an extensible link 166 which is actuated by the controlling mechanism hereinafter to be described.

By reason of the construction above-described, the rotation of the frame 158 upon detection of the absence of an article from the conveyer separates roll 153 from the roll 152 and simultaneously moves the rubber faced bar 160 into clamping engagement with the rubber faced clamping member 162, thereby arresting the feed and preventing retrograde movement of the web 138. A mechanism is provided, as will hereinafter appear, for arresting the rotation of the supply roll S simultaneously with the arresting of the feed and clamping of the web. When the feeding mechanism is again started, it is necessary to overcome the inertia of the supply roll, and means are provided for gradually imposing the force of the feeding mechanism upon the web in such manner as to avoid an abrupt strain which might break or tear the web. This is accomplished in the present invention by the take-up mechanism above-described. When the feeding mechanism is started after stoppage, the tension upon the web acts upon the take-up roll 148 to draw it downwardly against the action of the spring on the rod 150, thereby gradually increasing the strain upon the web until the supply roll resumes rotation. As the supply roll approaches its normal rate of rotation, the spring on the rod 150 will gradually raise the take-up roll to normal position illustrated in Fig. 14.

The controlling mechanism

As heretofore described, controlling mechanism is provided operable upon detection of the absence of a blank or article to which a layer of thin material is to be applied to remove the adhesive-applying means and the cutter for the web of thin material from operative position and also to interrupt the mechanism for feeding the web of thin material. In the particular embodiment of the invention illustrated herein, a feeler 167 extends into the path of the articles which are forwarded by the chain conveyer from the pick-off mechanism. This feeler comprises an arm having a curved end section which may, in the absence of an article upon the conveyer, rest in a recess in the horizontal flange of the conveyer frame 20. The feeler arm 167 is secured to the end of a shaft 168 which is journaled in a bushing 169 in a tubular, horiozntal boss 170 on the bracket 171 which is bolted to an extension of the bracket 28. A spring 172 which encircles the shaft 168 is secured at one end of the shaft and at its other end to the bushing 169, the spring being under such tension as normally to depress the feeler 167 into the recess. The bushing 169 is secured against rotation in the boss 170 by a suitable screw 173 seated in the boss and engaging a groove in the bushing. The shaft 168 has also secured to it a dog 174 which has an offset end adapted to engage a notch in a normally oscillated rock shaft 175.

The rock shaft 175, desirably, is a hollow shaft having in each end hardened plugs 176 which are mounted in roller bearings 177 (Fig. 7) in brackets 178 which are mounted on the main side frames 1 and 2. The mechanism for oscillating the rock shaft 175 comprises an arm 179 which is clamped on the reduced end of the plug 176 and is connected by a downwardly extending link 180 to an arm 181 upon a shaft 182 which extends longitudinally of the side frame 1 and is journaled at its opposite end in suitable bracket 183 which is secured to the side frame 1.

The shaft 182 has secured near its opposite end a downwardly extending arm 184 having on its end a follower 185 which engages a face cam 186 which is mounted upon a continuously driven shaft 187. The cam follower 185 is held in yielding engagement with the cam 186 by spiral spring 188 which acts upon the arm 181. The shaft 182 also has fixedly secured to it adjacent said opposite end, a striker arm 189 which is adapted to engage the ends of a series of pins 190 which are slidably mounted in a cylindrical carrier 191 which is fixedly secured to a continuously driven shaft 192, the striker being adapted to force the pins outwardly with respect to the side frame 1. A short shaft 193 which is mounted in suitable bearings in the side frame and in a bracket 194 is located just below the pin carrier 191 and has secured to it an inner pair of oppositely disposed arms 195 and also another outer pair of similar arms 196 which extend from the shaft at ninety degrees angle to the arms 195. The arms 195 and 196 are adapted to be alternately engaged by one of the pins 190 according to whether the pin is in outwardly extending position or in inwardly extending position. A restoring cam 197 which is mounted upon an extension 198 of the side frame 1 is positioned to engage the outer ends of the pins 190 as they are rotated past it. In other words, the striker 189 serves to push the pins 190 outwardly, and the cam 197 acts to force the pins 190 inwardly during the normal operation of the machine. A suitable brake 193$^x$ is provided to prevent over-riding of the shaft 193 so that the arms 195 and 196 are properly positioned to be acted on by the pins 190.

When, therefore, the feeler 167 detects the absence of a blank or other article from the conveyer chain 7 and rests in the recess of frame 20, the dog 174 will engage the notch in the rock shaft 175 and prevent its oscillation. It will, thereby, hold the follower 185 out of engagement with the face cam 186 and also hold the striker arm 189 out of engagement with the inner end of the pin so that the pin will not be forced outwardly. When the pin 190 thus extends inwardly as illustrated by dotted lines in Fig. 12 it will engage one of the arms 195 on the short shaft 193 and rotate it a quarter turn, thereby actuating mechanisms to remove the adhesive-applying roll and knife carrier from operative position and also acting to apply a brake to the shaft of the supply roll S for the thin covering material 138. It also actuates the mechanism for separating the feed roll 153 from operative relation to the companion feed roll 152 and simultaneously actuates the mechanism for clamping the web of thin material.

The aforesaid mechanism is operated from the shaft 193 in the following manner. The shaft 193 has secured upon it two sprocket wheels 199 and 200. The sprocket wheel 199 drives a vertical sprocket chain 201 which in turn, drives a sprocket 202 upon the shaft 100 (Figs. 1, 10, and 13) upon which the cam 99 is mounted which acts upon the cam follower on the lever 98, thereby swinging the lever about its fulcrum 97 and raising the adhesive-applying roll 30 out of operating position relatively to the endless perforated belt 29, thus preventing the application of adhesive to the belt. The other sprocket wheel 200 on the shaft drives a horizontal sprocket chain 203 (Fig. 1) which actuates the sprocket upon the shaft 204 which has secured to it a cam 205. The cam 205 engages the follower upon an arm 206 which is fixedly secured to a shaft 207 having a forwardly extending arm 208 which is connected by a vertical link 209, the upper end of which is connected to an arm 210 of a member in the general form of a bell crank, the other arm 211 of which is connected by spring 212 to a stationary part of the frame. The shaft 132 of the knife carrier 130 (Fig. 14) is mounted in bearings in the bell crank member and the bell crank member, in turn, is eccentrically mounted in bearings in the side frame so that when the link 209 is drawn downwardly by the action of the cam 205 against the tension of the spring 212, the bell crank member is rotated in a direction to raise the shaft 132 and thereby remove the cutting knives from operative relation to the companion cutting blocks 129 on the feeding, cutting, and applying roll 31.

The upwardly extending arm 211 of the bell crank member is also connected to a link 213, the rear end of which is pivotally connected to a bell crank lever 214 which actuates the brake band 215 upon a brake drum 216 which is fixedly secured to the shaft of the supply roll S. The shaft 207 is also provided with a rearwardly extending arm 217 which is connected to the lower end of the link 166 which acts through the frame 158 to separate the feed roll 153 from engagement with the driven feed roll 152 to prevent feeding of the web of thin material and also to clamp the web in the manner heretofore described.

The controlling mechanism, therefore, upon detection of the absence of an article from the chain conveyer 7 simultaneously interrupts the oscillation of the rock shaft 175 and actuates the mechanisms above-described to remove the adhesive-applying roll from operative position, to remove the cutter blades from operative relation to the cutting, feeding, and applying roll, to apply a brake to the shaft of the supply roll to render the feeding mechanism for the web of thin material inoperative, and to clamp it against retrograde movement.

When another article is being forwarded by the conveyer 7, the feeler 167 will be raised, thereby releasing the dog 174 from engagement with the notch in the rock shaft 175, thereby permitting the follower 185 again to engage the face cam 186 and thereby resume operation of the shaft 175. At the same time, the controller shaft 182 resumes the actuation of the striker 189 to force the pin 190 outwardly so that it then engages one of the arms 196 on the shaft 193 giving the shaft a quarter turn into the position illustrated in Fig. 10 so that the cams actuated by the sprocket wheels 199 and 200 will be rotated sufficiently to restore the mechanisms to normal operating positions. After the outwardly extended pin has acted upon the arm 196, it will be forced inwardly from farther rotation by the cam 197.

*The driving mechanism*

The driving mechanism which is illustrated in the accompanying drawings comprises a main drive shaft 218 (Fig. 2) which is mounted in brackets upon the side frame 2 and is driven by a pulley 219 from any suitable source of power. The main drive shaft 218 has upon one end a bevel pinion 220 which meshes with a bevel gear 221 which is fixedly secured to a spur gear 222 which is secured to a short shaft 223 mounted in suitable ball bearing in the side frame 2 (Fig. 2 and 12). The gear 222 has bolted to its inner face another gear 224 which meshes with a pinion 77 on the shaft 74 heretofore described. The pinion 77 drives the gear 104 which, as previously described, operates through intermediate mechanism to rotate the adhesive-applying roll 30.

The shaft 223 has upon its opposite end a pinion 225 which meshes with a gear 226 on the shaft 192 upon the opposite end of which is mounted the pin carrier 191 of the controlling mechanism.

The shaft 192 also has secured to it adjacent the side frame 1 a sprocket wheel 227 (Figs. 2, 10 and 12) which drives a sprocket chain 228 which, in turn, drives a sprocket 229 which is fixedly secured to the shaft 187 of the cam 186 which acting through the cam follower and shaft 182 and mechanisms illustrated in Fig. 7 oscillates the rock shaft 175 of the controlling mechanism.

The gear 222 which is fixedly secured to the bevel gear 221 and to the short shaft 223 meshes with a pinion 230 upon the shaft 13 (Fig. 3) having a sprocket wheel which drives the sprocket chain 27 which, in turn, drives a sprocket 231 fixedly secured to a shaft 232 which carries the roll 26 of the pick-off mechanism. The shaft 232 is also provided with a pinion which meshes with a gear 233 which is fixedly secured to a shaft 234 of the pick-off drum. The gear 233, in turn, drives a pinion 235 upon the shaft of the brush 11. The shaft 13 is also provided with sprockets which engage and drive the sprocket chain conveyer 7 which forwards the articles from pick-off mechanism to the endless perforated conveyer 29.

The main shaft 218 has secured upon its opposite end a bevel pinion 236 which engages a bevel gear 237 (Figs. 1 and 15) which is bolted to a member 238 which is keyed to a short shaft 239 which is mounted in ball bearings in the side frame 2. A spur gear 240 which is secured to the carrier 238 by the same bolts as those which connect the bevel gear 237 to it, meshes with the gear 145 (Fig. 1) on the central shaft 35 (Fig. 19), the opposite end of which is provided with the cam 144 which controls the mechanism for releasing the tension upon the web during cutting operations.

The short shaft 239 has also secured to it a spur gear 241 which meshes with the gear 126 through which rotation is imparted to the cutting, feeding, and applying cylinder. The gear 126 meshes with a gear 242 of the same diameter upon the shaft of the cutter carrier 130, thereby insuring proper cooperation between the knives 137 on the carrier and the cutting blocks 129 of the feeding, cutting, and applying cylinder.

The gear 241 also meshes with an intermediate pinion 243 which, in turn, meshes with a gear 244 on the hollow shaft 34 which drives the drum 33 which carries the perforated endless conveyer belt. As heretofore stated, the hollow shaft 34 is provided with a gear 41 which meshes with the gear 40 upon the shaft 37 which is mounted in a pivoted frame construction for positively driving the belt tightener for the endless belt conveyer.

One of the novel features of the invention comprises power transmitting means which may be adjusted while the machine is in operation to control the rate at which the web of thin material is fed to the cutting, feeding, and applying roll and which will enable the width of the section cut from the web to be varied in accordance with the adhesive-coated area upon the articles to which the covering layer is to be applied.

The mechanism for thus actuating and controlling the feed of the web of thin material comprises a sprocket wheel 245 which is fixedly secured to the main shaft 218 and driving a downwardly extending sprocket chain 246 which in turn drives a sprocket wheel 247 upon a shaft 248 of a variable speed mechanism such as a Reeves transmission 249 which is conventionally illustrated in Fig. 2. Power is transmitted from the variable speed mechanism through a sprocket 250 which drives a vertical sprocket chain 251 which, in turn, drives a sprocket wheel 252 on a horizontal shaft extending into a gear box 253 containing gear transmission mechanism of a usual type in which the ratio of the gears may be varied. The gears in the gear box are arranged to drive a shaft 254 (Figs. 1 and 19) of the rubber covered feed roll 152. A gear 255 which is secured to the shaft 254 meshes with a companion gear 256 of the same diameter which is fixedly secured to the shaft of the companion rubber covered feed roll 153 so that these feed rolls are driven at the same speed. As heretofore explained, the rubber covered feed roll 153 is separated from the companion roll 152 by the controlling mechanism when absence of an article from the conveyor chain 7 is detected. Such separation of the feed roll also effects the separation of the gears 256 and 255, thereby insuring stoppage of the feeding of the web of thin material.

It has heretofore been pointed out that the section of covering material which is caused to adhere to the cutting, feeding and applying cylinder by suction, supplemented by the adhesion due to static electricity, is discharged from the cylinder by air pressure after the suction has been cut off. Inasmuch as the projection of air under pressure through the holes in the cylinder wall is progressive, it may happen that after the covering section has been secured to the foundation material the front end of the united sections may, by reason of static or otherwise, continue to adhere to the periphery of the cylinder.

The present invention includes means for disengaging the united sheets under such circumstances and for insuring proper delivery of the united sheets in flat condition from the machine. The preferred means, which is illutrated in Figs. 8 and 22 of the drawings, comprises a cylindrical brush 257 which is so positioned as lightly to engage the feeding and applying cylinder and at its lower portion to be narrowly spaced from the perforated conveyer belt 29. Means are provided for rotating the brush in a direction to detach the front end of the united sections from the feeding and applying cylinder 31 and insure its smooth deposition upon the endless conveyer 29. The shaft of the brush 257 is rotatably mounted in the free ends of a pair of arms 258 which are secured to a shaft 259 journaled in suitable bearings in the side frames 1 and 2. The shaft 259 has secured to one or both ends a bracket 260 having a split portion which embraces the shaft and is adapted to be clamped upon it by a machine screw 261. The bracket 260 is provided at its lower end with an arcuate slot 262 through which a machine screw 263 extends and clamps the bracket to the side frame. By loosening the screw 263 the bracket 260 may be rocked to rotate the shaft 259 in such manner that the arms 258 will adjust the position of the brush in proper relation to the periphery of the feeding and applying cylinder 31 and to the endless conveyer 29.

The brush 257 is provided with one or preferably a plurality of pulleys or rolls 264 of considerably less diameter than the periphery of the brush 257 and the pulleys or rolls are driven by an endless belt or belts 265 which pass over the pulleys or rolls 264 and pulley or roll 266. The shaft 267 of the pulley or roll 266 is journaled in suitable bearings in supplemental brackets 268 which are secured to the ends of the side frames 1 and 2. The shaft 267 of the pulley 266 is provided with a gear 269 which meshes with a complementary gear 270 of the same diameter. The gear 270 is driven from a gear 271 which in turn is driven by a gear 272 on the shaft 35 of the rear roll 33 over which the endless belt 29 passes.

The ratio of the gears 272, 271, 270, and 269 is such that the belt 265 is driven at the same speed as that of the belt 29 so that the united articles carried by the belt 29 will be held in flat position by the lower lead of the belt 265.

Suitable means are provided for maintaining proper tension upon the belt or belts 265, such for example as a roller 273 carried in suitable arms 274 which are provided with a split end portion adapted to be adjustably clamped by a suitable screw upon the shaft or stud which is fixedly secured in the side frames.

By reason of the construction above described the adjacent leads of the belt 29, and the belt 265 travel at the same rate of speed while the periphery of the brush 257 which engages the periphery of the cylinder 31 travels at a somewhat greater speed because of the greater diameter of the brush than the pulleys or rolls 264 and the forward end of any section which adheres to the periphery of the cylinder 31 will be forced downwardly out of engagement with the cylinder. If the section is bent as it is forced downwardly it will be straightened out by the brush and properly deposited in flat condition upon the endless conveyer 29 and thereafter discharged from the machine in flat condition.

One of the important features of the invention as heretofore pointed out comprises supplemental links upon the conveyer chains for transferring the foundation articles from the adhesive-applying mechanism to the conveyer which carries said articles to mechanism for cutting and applying covering material to the foundation articles, this mechanism being in the form of supplemental links adapted to be detachably secured to the chain at any predetermined points and presenting upwardly extending abutments to engage the rear edge of the foundation articles together with means for lifting the rear ends of the articles as the chains pass around the sprocket wheels at the rear ends thereof so as to avoid either bending downwardly of the articles or displacement of the articles from properly timed relation to the covering applying mechanism.

In the construction illustrated herein the abutments 19 heretofore mentioned comprise lugs having flat forward faces extending upwardly from one side of a preferably solid steel block 275 which is provided with transverse bores adapted to receive extensions of hinge pins 276 and 277 which connect adjacent links to the chain 7 or studs.

Any suitable means may be provided for detachably securing the blocks 275 upon the pins. As illustrated herein the block is provided at its rear end with a vertical bore which communicates with a slot in the bottom of the block which extends longitudinally thereof and which at its rear end traverses the hole in which one of the pins 277 is mounted. The pin 277 is provided with a groove complementary to the slot and a spring wire 278, which extends downwardly through the vertical bore and longitudinally of the slot in the block, engages the groove in the pin 277 thereby locking the block firmly upon the hinge pin extension 277. In order to permit ready removal of the block 275 the block is provided with a drill hole 279 midway of its length and so positioned that the wire 278 when in locking position crosses the bore 279. By inserting a tapered pin or wedge in the bore 279, the spring 278 may be forced downwardly out of its engagement with the groove in the hinge pin extension 277, thereby unlocking the block so that it may be slid lengthwise of the pins 276 and 277 and removed from the chain.

Inasmuch as the flat forward face of the abutment 19, which engages the rear edge of the article, will be moved from vertical position toward horizontal position as the chain passes around the sprocket on the shaft 13, it will be likely to bend down the rear end of the article or to displace it from properly timed relation to the covering applying mechanism, and in order to avoid this the chain 7 is also provided with a companion supplemental link member adapted to raise the article gradually from engagement with the abutment as it is delivered to the conveyer mechanism for forwarding the article to the covering applying mechanism.

In the preferred construction illustrated in Figs. 3A and 3B this supplemental link mechanism comprises a block 280 having a tail 281 projecting over a portion of the block 275 alongside the abutment 19. The block 280 is similarly mounted upon hinge pin extensions 276 and 277 and is detachably secured to the hinge pins by a similar spring wire 278.

The detachability of these supplemental link members enables them to be properly positioned upon the chain when the other mechanisms are adjusted to deliver one or two or three blanks to each revolution of the covering applying mechanism.

While the mechanisms above described constitute a preferred embodiment of the invention, various modifications in form, construction of certain of the elements, and their combinations, may be made, and various accessories may be employed either as substitution for or in combination with the mechanisms heretofore specifically described. Certain of such mechanisms are illustrated in Figs. 23 to 33 of the drawings.

In the construction shown in Figs. 23, 24, and 25, means are provided for varying the area circumferentially of the cylinder through which suction is applied to the covering material to correlate the required suction to the amount of static electricity generated due to the area of contact of the Cellophane or other covering material with the cylinder or with the character of the sheet. In the construction illustrated in Figs. 23 and 24, which correspond respectively to portions of Figs. 15 and 14, a portion of the valve member 114 within the cylinder 31 is surrounded with an adjustable cylindrical sleeve 282 which covers the port 119 leading from the suction bore 118 to the conduits 109 which communicate with the respective chambers 108 having perforations through their peripheral walls through which suction is applied to the covering material, to cause it to adhere to the cutting, feeding and applying drum. This sleeve 282 is provided with apertures or perforations 283 around a portion of its circumference and the sleeve is rotarily adjusted to determine the circumferential area through which suction will be applied to the sheet of covering material.

The preferred means for adjusting this sleeve to correlate the area through which suction is applied to the size of the section of covering material comprises an arm or plate 284 of steel, or other rigid material, which at its outer end engages a slot 285 in the sleeve, and at its inner end is fixedly secured in a slot in a rod 286 which is journaled in suitable bearing members 287 which are secured to the wall of the valve member 114. The rod 286 is secured by a suitable connection 288 to an actuating rod 289 which is journaled in a suitable bearing 290 in a conduit member 291 which is secured to the cylindrical boss on the frame in which the bearing member 114 is rigidly mounted.

The actuating rod 289 desirably is provided with a convenient handle 292 by means of which it may be rotated to adjust the sleeve 282. Suitable means (not shown) may be provided for locking the rod 289 in any desired adjusted position which may be required to correlate the area through which suction is applied through the cylinder wall to that of the covering material.

Where relatively narrow sections of covering material are to be applied to suitable foundation articles the capacity of the machine may be increased and waste of power required to produce suction upon the cylinder avoided by providing a cutting and applying cylinder formed in longitudinal sections cooperating with suitable feeding means for presenting articles to the several sections of the cutting, feeding and applying cylinder.

Such construction is illustrated in Fig. 29 in which the cutting, feeding and applying cylinder 31 is divided at suitably spaced intervals with radial webs 293. In such case the valve member 114 is provided with separate longitudinally extending conduits 294 and 295 which communicate respectively with ports 119—A and 119—B of the character illustrated in Fig. 17, and which in turn communicate with inwardly extending conduits 109 and 110 through which suction is applied through the chambers 108 and perforations in the cylinder 31 to the covering material.

As illustrated in Fig. 29 two of such suction conduits 294 and 295 are shown as communicating respectively with suitable pipes 296 and 297 leading to a suction pump. Obviously the opposite end of the valve member 114 may be provided with similar suction conduits communicating respectively with other ports 119—C, etc., so that the feeding and applying cylinder may be enabled simultaneously to handle any desired number of sections of covering material in the manner above described and to apply the same to suitable foundation articles which are presented to the cutting and applying cylinders simultaneously.

By providing valves in the several pipes 296 and 297, etc., any one or more of the sections of the feeding and applying cylinder may be employed so that the device is not only adapted to apply a plurality of covering layers to articles, but where only a single web of narrow covering material is to be applied suction may be shut off from the remaining sections thereby avoiding the unnecessary waste of power which would occur if suction were applied to all of said sections.

In order to distribute the suction more completely over the area of covering material which is carried by the cutting, feeding and applying cylinder, the outer ends of the ports 107 may be provided with conoidal countersinks 298, as illustrated in detail in the lower portion of Fig. 29. By narrowly spacing the holes 107 so that the peripheries of the countersinks are very closely adjacent to each other, suction may be uniformly applied practically throughout the entire area of the section of covering material which engages the cylinder. Of course, such countersinks may be applied to the cutting, feeding and applying cylinders of any of the constructions illustrated in the drawings.

Where certain types of covering material are employed, such as certain transparent cellulosic materials, the greater peripheral rate of speed of the cutting, feeding and applying cylinder than the rate of speed at which the covering material is supplied to the cylinder, produces an excessive amount of static electricity. The production of such excess of static electricity may be reduced or substantially avoided by covering the perforated surface of the cylinder with suitable material, such as rayon, or cotton cloth, or with finely woven copper screen cloth in which the interlacing of the web and woof is such that only parts of the loops of wire engage the covering material.

In some instances the surfaces of the covering material are such as to become easily abraded, as for example, where the surfaces of the covering material have been treated with a moisture-proof composition, or which present wax-like surfaces either of which is easily scratched. Under such circumstances the cylinder may be covered with a perforated layer of the same material, or a material having the same characteristics as that of the covering material. Usually it is found that a covering of rayon, or other woven cellulosic material is satisfactory. As illustrated in Figs. 26 and 27 of the drawings sections 299 of rayon, or other material of the character described, are secured to the periphery of the cylinder in such manner as to cover the perforations 107. The ends of these sections of woven covering material may be secured to bars 300 which extend longitudinally of the feeding and applying cylinder and desirably are adapted to be seated in suitable recesses in the cylinder extending longitudinally thereof adjacent to the cutting blocks 129, the bars 300 being firmly clamped in position by suitable screws 301.

It has heretofore been pointed out in connection with the description of the cutting mechanism that the cutter carrier comprises circular heads 130 which are fixedly connected to a cylindrical spacing member 131 which surrounds and is fixedly secured to the shaft 132 which is driven by suitable mechanism in timed relation to the rotation of the cutting, feeding and applying cylinder. It is also pointed out that the cylindrical spacing member is provided with a plurality of integral webs 133 which are so spaced as to cooperate with the cutting blocks in the cylinder and that when the knife, which is mounted in the sockets of any one of the webs, comes in contact with the complementary cutting member 129 upon the cylinder the web of covering material will be clamped and severed by a pinch cutting action.

Inasmuch as the speed of the cutting, feeding and applying cylinder is greater than that at which the web of covering material is being fed, it is desirable in some instances to provide supplemental means for clamping the web of covering material tightly against the periphery of the cylinder slightly before and during the time the material is being pinched-cut by the knife, thereby to avoid any tendency to tear the web of material by reason of the tension imposed upon it by the sudden increase in speed.

A convenient mechanism for accomplishing this purpose, is illustrated in Fig. 30 in which the cutting blade 137 is clamped between suitable blocks 302 and 303 seated in the longitudinal recesses of the web 133 of the cutter carrier. The clamping blocks 302 and 303 are provided with complementary recesses adjacent the blade 137 and bars 304 and 305 of rubber, or other suitable resilient material, are clamped in said recesses against the opposite sides of the blade 137. These bars extend lengthwise throughout the cylinder alongside the blade and may project slightly beyond the edge of the blades so as to engage and clamp the web of covering material firmly against the complementary cutting member 129 of the cutting, feeding and applying cylinder in advance of, during and slightly after the severance of the section of covering material from the web.

While the severance of the web by the pinching action of cooperating rotating cutting members carried by the cutting, feeding and applying cylinder has heretofore been described in detail, such pinch cutting may be accomplished in other manners, such for example as diagrammatically illustrated in Figs. 32 and 33 which not only illustrate the different manner of pinch cutting the sections from a web of covering material but also illustrate different embodiments of the invention for applying a layer of covering material to a foundation material in the form of a sheet or in the form of separate blanks or articles.

In the construction diagrammatically illustrated in Fig. 32 a roll 306 of foundation material 307 is suitably mounted upon a shaft and the web 307 is drawn therefrom by a pair of preferably constantly rotating feed rolls 308 from which it passes over a guide roll 309 into engagement with the periphery of a cylinder 310 having a perforated peripheral surface through which vacuum may be applied in the manner heretofore described in connection with the cutting, feeding and applying cylinder 31. In this construction cutter bars 311 are seated in suitable recesses in the periphery of the cylinder 310 in properly coordinated relation to like cutter bars in a companion cylinder for applying the section of covering material to the section of foundation material severed from the web 307. Instead of having a rotating cutter carrier as heretofore described the cylinder 310 is provided immediately adjacent the cutter 311 with a recess 312 and the cutter comprises a flat steel spring plate 313 which is rigidly mounted in a bracket 314 and is adapted to engage the web of material as it passes around the cylinder. When the spring plate 313 engages the web over the recess 312 it presses it inwardly into said recess thereby pinching the web between it and the edge of the cutter 311, thus severing the section from the web. The severed section is then carried on the periphery of the cylinder 310 by suction into engagement with the complementary section of overlaying material.

In the construction shown in Fig. 32 a web 315 of overlaying material is carried upon a suitable roll 316 and is forwarded by a pair of preferably continuously rotating rollers 317 over a guide roller 318 and the periphery of a cutting, feeding and applying cylinder 319 similar to the cutting, feeding and applying cylinder 31 and to the cylinder 310. The web 315 is held upon the cylinder 319 by suction in the manner above described. The cylinder 319 is provided with a knife 320 which is located immediately rearwardly of the recess 321 extending longitudinally of the cylinder. A spring plate 322, which is rigidly anchored in a suitable support 323, engages the web and cooperates with the recess 321 in the manner heretofore described to bend the web into the recess and to produce with the edge of the knife 320 a pinching cut. The section of overlaying material thus severed from the web 315 is held upon the periphery of the cutting, feeding and applying cylinder 319 and is presented to suitable mechanism for applying adhesive to a predetermined area thereof.

The adhesive-applying mechanism as graphically illustrated comprises a reservoir 324 having a roller 325 partially immersed therein and engaging a transferring roller 326 which is provided with a raised surface presenting a pattern similar to that heretofore described in respect to the adhesive-applying roller 30. The adhesive-applying roller may if desired be provided with a shell similar to the shell 82 shown in Fig. 10 and having a raised pattern surface for applying the adhesive properly to the severed section of overlaying material. The cylinders 310 and 319 are relatively adjustable as in usual constructions in order that the overlaying material may be deposited upon and pressed against the foundation material with desired force and in proper registry.

It will be observed that the relation of the upper and lower rolls 310 and 319 through the periphery of each of which suction is applied to the web of material which is engaged by it and the cutting mechanism cooperating with the respective cylinders is the same, and also that the material is fed from rolls to the respective cylinders in substantially the same manner. It will therefore be obvious that either the web 307 or the web 315 may be considered as the foundation material and the other as the overlaying material. If desired the web of foundation material, for example the web 307, may be fed continuously to the cylinder 310 at the same surface speed as that of the cylinder, or at a slower rate of speed than the peripheral speed of the cylinder 310, thereby causing a slipping between the free end of the web and the surface of the cylinder. Similarly, the web 315 of overlaying material may be fed at the same speed as the speed of rotation of the cylinder 319, or at a slower speed as above described. The cylinders 310 and 319 of course are driven at the same peripheral speed so that predetermined areas of the foundation material and of the overlaying material will be progressively brought into contact at the bite of the cylinders and may be progressively released from the cylinders by blasts of air under pressure in the manner heretofore described. The united laminations may then be forwarded by suitable pairs of feeding rolls 327 to a suitable receptacle or stacker 328.

In case that either the web 307 or 315 is fed at a lower rate of speed than the peripheral speed of the cylinder, the guide rolls 309 and 318 should be in the nature of let-off rolls to permit the web to assume the peripheral speed of the suction cylinder at the time the web is severed without imposing undue strain upon the web.

Suitable mechanism such as the positively actuated let-off mechanism illustrated in Fig. 14, and heretofore described, may be employed, or alternatively a yieldable let-off mechanism such as that conventionally illustrated in Fig. 31 may be used in which a guide roll 329 engages the web 330 of material which is drawn from the roll of material by a pair of feed rolls 331 and 332 corresponding to feed rolls 152 and 153 shown in Fig. 1, or to the pairs of rolls 308 or 317 of Fig. 32, and delivered to the periphery of a cutting, feeding and applying cylinder 31 of Fig. 14, or the cylinders 310 or 319 of Fig. 32. The roll 329 is mounted upon a pair of arms 334 of bell cranks which are pivoted upon a shaft 335 which is mounted in suitable bearings upon the side frames 1 and 2. The other arms 336 of the bell crank levers are connected to springs 337 which are adjustably anchored in bosses 338 extending outwardly from the frames 1 and 2 (not shown). Abutment screws 339, which are mounted in bosses 340 in the main frame, engage the rear ends of the levers 336 and limit the downward movement of the let-off roll 329. It is obvious that when the web 330 temporarily assumes the higher peripheral speed of the cutting, feeding and applying cylinder the roller 329 will be raised against the tension of the spring 337, thereby avoiding the application of undue tension to the web. As soon as the web is severed the spring 337 will draw the guide roll 329 downwardly toward normal position until its movement is limited by the abutment screw 339.

Another let-off mechanism, which is adapted for use if the web of covering material is fed intermittently and wherein the cutting is at the fast part of the cycle of feeding or where there is an alternate slow and fast feeding of the web of material and cutting is effected at any speed higher than the slowest speed, is graphically illustrated in dotted lines in Fig. 22 of the drawings in which the guide roll or bar which engages the web of overlaying material is offset from the axis of a continuously rotated mechanism so that it has an alternating let-off and take-up movement. As shown in Fig. 22 the web of material 138 (see Fig. 14) passes between the clamping members 160 and 163 and thence between the constantly driven feed rolls 152 and 153 beneath a guide roll 341 having end arms 342 which are offset from axially alined journal members 343 which are mounted in suitable bearings in the side frames. One of the journal members 343 is provided near its end with a gear 344 which meshes with a gear 345 journaled upon a stud shaft 346 extending from the frame and the gear 345 in turn meshes with a gear 348 upon one end of the cutting, feeding and applying cylinder 31. This construction is particularly adapted for properly manipulating the web where a series of uniform short sections are successively applied to foundation articles.

Another modification and adaptation of the invention is shown in Fig. 33 in which a series of foundation articles or blanks 349 are stacked in a hopper having a vertical wall 350 and a reciprocating feeding member 351 actuated by mechanism including an eccentric 352 and pitman 353 to engage the lowermost article in the stack and feed it between a pair of positively driven feed rolls 354 which in turn deliver it to a presser roll 355 located vertically beneath and in proper relation to a feeding and applying cylinder 356. The cutting, feeding and applying cylinder may be either of the type shown in Fig. 14 or that illustrated in Fig. 32 the latter of which is illustrated.

The web 357 of overlaying material is drawn from a suitable supply roll by a pair of feeding rolls 358 and directed by a guide roll 359 to the periphery of the cutting, feeding and applying roll to which the web is caused to adhere by suction. In the construction illustrated in Fig. 33 the cutting mechanism is similar to that illustrated in Fig. 32 and heretofore described and designated by the same numerals. If desired a presser roll 360 mounted upon one arm of a suitable bell crank lever 361 may be interposed between the cutting point and the position in which adhesive is applied to the severed section of the web. The roll 360 may be yieldably held against the web by a spring 362 acting upon the other arm of the bell crank lever. In this construction the adhesive is applied to a predetermined area of the severed section of the web by mechanism similar to that illustrated in Fig. 32 which is designated by the same numerals.

It has heretofore been pointed out that one of the novel features of the present invention comprises driving mechanism which may be adjusted while the machine is in operation to control the rate at which the web of covering material is fed to the cutting, feeding and applying cylinder in such manner as to enable the section cut from the web to be varied in accordance with the area of the foundation article to which it is to be applied, such mechanism operating through the variable speed transmission mechanism 249 and associated parts. This controlling mechanism may be automatically actuated continuously to maintain proper registry between the foundation articles and the covering material by an electric eye mechanism so positioned that the foundation material will pass through the field or fields of the electric eye mechanism.

As graphically illustrated in Fig. 33 the web of covering material passes through the field of electric eye mechanisms 363, the web being so printed, cut or apertured that upon detection by the electric eye of any departure of the covering material mechanism from proper synchronism with the mechanism for cutting, feeding and applying covering material thereto the variable speed mechanism will be adjusted in such manner as to restore the parts to proper coordination. While the electric eye mechanism is shown graphically in its relation to the web of covering material in Fig. 33 of the drawings, where it may be illustrated more clearly, it will be understood that such automatic controlling mechanism may be embodied in the machine illustrated in Figs. 1 to 19 inclusive in operative relation to a properly prepared web of covering material which will enable the electric eye to detect any departure from proper synchronism with the foundation material and thereby automatically cause the actuation of the controlling mechanism as above described.

It will be understood that the machine illustrated in Figs. 1 to 19 inclusive may be modified by the substitution of mechanisms of the character shown in the remaining figures or by the application of accessory mechanisms illustrated in said figures within the meaning and scope of the claims of this application, and that the following specific description of the operation of the machine, as shown in Figs. 1 to 19, is not restrictive of the breadth of the claims.

In the operation of the machine a stack of superimposed blanks or articles is placed in the magazine 3 and the articles are successively carried therefrom by the pick-off roll 5 to the endless conveyer chains 7 where the rear end of the article is engaged by the abutments 19, thus insuring their proper positioning on the carrier. The endless chain on the carrier delivers them upon the endless perforated conveyer belt 29 which is driven at the same speed as the endless chain carrier. The hold-down driving roll 70 insures proper feeding of the articles from the endless chain conveyer to the endless perforated belt.

When the articles are deposited upon the endless conveyer belt 29, they are positively held upon the belt by the suction in the longitudinally extending troughs which engage the under surface of the upper lead of the perforated belt conveyer. The articles are carried by the perforated conveyer belt first beneath the adhesive-applying roll which during its rotation applies adhesive to a predetermined portion or area of the article. The endless perforated conveying belt then carries the articles, while still subject to suction, beneath the cutting, feeding, and applying cylinder, and after a section of covering material has been applied to the articles, they are delivered from the end of the belt as it passes over drum 33.

The web of Cellophane or other covering material which is carried by a supply roll S is led first downwardly beneath the guide 147; thence upwardly to a yieldable take-up roll 146; thence downwardly along the guide 151; thence between the separated clamping members 161 and 162 and between the rubber covered feeding rolls 152 and 153; thence downwardly beneath the let-off and take-up roller 139 which guides it to the periphery of the cutting, feeding, and applying cylinder 31. As heretofore stated, the feeding, cutting, and applying cylinder is driven at a greater peripheral speed than the rate of delivery of the web from the feed roll. The web, therefore, has a slipping engagement with the cutting, feeding, and applying roll which generates static electricity which causes it to cling to the feed roll and by such slipping engagement to iron out all wrinkles which may be present in the web. At the same time, the free end of the web is caused to adhere to the roll by the vacuum which is induced through the perforations of the roll.

Inasmuch as the perforations in the wall of the cylinder are closely associated with each other, suction will be progressively applied to the end of the web of covering material as the successive holes pass beneath the end of the web, so that a smoothing action is applied to the web which will progressively iron out the wrinkles to the very end of the web. As the web is fed forward the area of the web which is held in contact with the cylinder by vacuum progressively increases so that the part of the web which contacts with the cylinder is placed in control of the vacuum progressively over a major portion of the web area before severing it and also after the section is severed from the web.

The rate of delivery of the web by the positively driven rubber covered feed rolls 152 and 153 is such as to position the free end of the web in relation to the cutting instrumentalities so that the latter will sever exactly the predetermined section from the web. When the web is about to be clamped between the cutters, the guide roller 139 is raised by the cam mechanism described so as to permit the web to assume the same speed as the peripheral speed of the cutting and applying roll, thereby avoiding any undue tension on the web during the cutting operation. After the section of covering material has been severed from the web, it is carried at the greater normal peripheral speed of the cutting, feeding and applying cylinder into the position at which it registers with the adhesive-coated portion of the article to which it is to be applied. When the severed section comes into registry with the adhesive-coated portion of the article, it is discharged from the periphery of the feeding, cutting, and applying cylinder and transferred to the adhesive-coated portion of the article.

If the united sheets tend to adhere to the cutting, feeding and applying roll 31 they will be removed from said adhesion by the rotating brush 257 so that they will be properly forwarded by the endless conveyer 29 to the discharge end of the machine.

The rate at which the web of covering material is delivered by the rubber covered feed rolls 152 and 153 may be coordinated with the cutting mechanism whether one, two, or three knives are provided for severing the web from the sheet. This is particularly important where the web of covering material has been previously printed and where it is necessary to sever the web in sections of predetermined width as indicated by the transverse dotted lines 255 illustrated in Fig. 20.

It will be understood that the particular embodiments of the invention shown and described herein are of an illustrative character and are not restrictive of the meaning and scope of the following claims.

Having thus described the invention, what is claimed as new and desired to be secured by Letters Patent is:

1. A machine of the class described comprising a traveling conveyer for a foundation material, means cooperating with and traveling at the same rate as said conveyer for feeding and applying sections of overlaying material upon said foundation material, auxiliary means for feeding the overlaying material at a slower rate of speed into slipping contact with said feeding and applying means to maintain a smoothing tension upon said web, means cooperating with said feeding means temporarily to clamp said web upon said feeding and applying means to cause said web to travel at the same speed as said feeding and applying means.

2. A machine of the class described comprising a traveling conveyer for a foundation material, means cooperating with and traveling at the same rate as said conveyer for feeding and applying sections of overlaying material upon said foundation material, auxiliary means for feeding the overlaying material at a slower rate of speed into slipping contact with said feeding and applying means to maintain a smoothing tension upon said web, traveling cutting members cooperating with said feeding and applying means operable temporarily to clamp said web thereon and to sever said section therefrom by a pinching action in suitably timed relation to the movements of said feeding and applying means and said conveyer.

3. A machine of the class described comprising a traveling conveyer for a foundation material, means for applying adhesive to a predetermined portion thereof, means cooperating with and traveling at the same rate as said conveyer for feeding and applying sections of overlaying material upon and in registry with the adhesive-bearing portion of said foundation material, auxiliary means for continuously feeding a web of overlaying material into slipping contact with said feeding and applying means to maintain a smoothing tension upon said web, traveling cutting means cooperating with said feeding and applying means operable temporarily to clamp said web thereon and to sever said sections therefrom in suitably timed relation to the movement of said applying means and said conveyer.

4. A machine of the class described comprising a conveyer for a foundation material, means for feeding and applying a section of cellulosic overlaying material to the foundation material in registry with a predetermined portion thereof, auxiliary means for feeding the web of cellulosic material at a slower rate of speed into slipping contact with said feeding and applying means, utilizing the static electricity generated thereby to cause adherence of said web to said feeding and applying means, cutting means operable to sever a section from said web in such manner that the severed section will be carried by its adherence to said feeding and applying means into said registering position at a greater rate of speed than that at which said web is delivered to the feeding and applying means.

5. A machine of the class described comprising a conveyer for a foundation material, means for applying adhesive to a predetermined portion thereof, means for feeding and applying a section of cellulosic overlaying material to the foundation material in registry with the adhesive thereon, auxiliary means for feeding the web of cellulosic material at a slower rate of speed than that of said feeding and applying means into slipping contact with said feeding and applying means, utilizing the static electricity generated thereby to cause adherence of said web to said feeding and applying means, cutting means cooperating with and moving at the same rate as said feeding and applying means operable to sever a section from said web in such manner that the severed section will be adhesively carried by said applying means into registering position at a greater rate of speed than that at which said web is delivered to the feeding and applying means.

6. In a machine of the class described having a conveyer for feeding a series of foundation articles, means for severing from a continuous web of flexible covering material sections complementary to predetermined areas of said articles and applying them to the respective articles comprising a feeding and applying cylinder for said flexible material, means for feeding said web of covering material to said cylinder at a slower speed than the peripheral speed of said cylinder, cutting means cooperating with said cylinder operable temporarily to clamp the web upon said cylinder and to completely sever a section from said web by a pinching action.

7. In a machine of the class described having a conveyer for feeding a series of articles having adhesive-coated portions, means for severing from a continuous web of flexible covering material sections complementary to the adhesive-coated portions of said article and applying them thereto comprising a feeding and applying cylinder for said flexible material, means for feeding said web of covering material to said cylinder at a slower speed than the peripheral speed of said cylinder, a rotatable knife-carrying member, cooperating cutting means on said knife-carrying member and said cylinder operable temporarily to clamp said web on said cylinder and to completely sever a section therefrom by a pinching action, and means for continuously rotating said cylinder and said knife-carrying member at the same peripheral speed.

8. In a machine of the class described comprising a conveyer for a series of articles, means for applying a covering of flexible material to predetermined portions of said articles comprising a continuously rotating feeding and applying cylinder cooperating with said conveyer, auxiliary feeding means for delivering a web of said flexible material to said cylinder at a slower speed than the peripheral speed of said cylinder to cause slipping engagement therewith, means for applying suction to the portion of the web which engages said cylinder, and cutting means cooperating with said cylinder temporarily to clamp the web upon said cylinder thereby to cause the section of the web in advance of the cutting means to assume the speed of the cylinder and thereupon to sever the section from the web by a pinching action.

9. In a machine of the class described comprising a conveyer for a series of articles, means for applying adhesive to a predetermined portion of each article, means for applying a covering of flexible material to predetermined portions of said articles comprising a continuously rotating feeding and applying cylinder cooperating with said conveyer, auxiliary feeding means for delivering a web of said flexible material to said cylinder at a slower speed than the peripheral speed of said cylinder to cause slipping engagement therewith, means for applying suction to the major portion of the web which engages said cylinder, a rotary cutter having the same peripheral speed cooperating with said cylinder while the web is adherent thereto by suction to sever sections from said web complementary to the predetermined portions of said articles and within the area to which suction is applied.

10. In a machine of the class described comprising a conveyer for foundation material, means for applying sections of covering material to predetermined portions of said foundation material comprising a perforated feeding and applying cylinder having a cutting member at its periphery, a complementary cutting member cooperating therewith, auxiliary feeding means for progressively delivering the web of covering material to said cylinder at a slower rate of speed than the peripheral speed of said cylinder, and means for progressively applying suction through the perforations of said cylinder to the portion of the web which engages the cylinder in advance of and during the severance of the web by said cooperating cutters.

11. In a machine of the class described comprising a conveyer for foundation material, means for applying sections of covering material to predetermined portions of said foundation material comprising a perforated feeding and applying cylinder having a cutting member at its periphery, a complementary cutting member cooperating therewith, auxiliary feeding means for progressively delivering the web of covering material to said cylinder at a slower rate of speed than the peripheral speed of said cylinder, means for progressively applying suction through the perforations of said cylinder to the portion of the web which engages the cylinder in advance of, during and after severance of said web and means for progressively relieving said suction when the covering material engages the foundation material on said conveyer.

12. In a machine of the class described comprising a conveyer for foundation material, means for applying sections of covering material to predetermined portions of said foundation material comprising a perforated feeding and applying cylinder having a cutting member at its periphery, a complementary cutting member cooperating therewith, auxiliary feeding means for progressively delivering the web of covering material to said cylinder, and means for progressively applying suction through the perforations of said cylinder to the portion of the web which engages the cylinder in advance of, during and after severance of said web, means for progressively relieving said suction when the covering material engages the foundation material on said conveyer, and means for forcing air under pressure through said perforations during and after engagement of the covering material with the foundation material.

13. In a machine of the class described comprising a main traveling endless conveyer, means traveling at the same rate of speed for feeding sections of flexible material upon said conveyer at predetermined intervals, a supplemental endless conveyer located above and in cooperative relation to said main conveyer to engage the articles deposited upon said main conveyer and insure proper delivery of the articles therefrom, and a brush located in cooperative relation to said feeding means and said conveyers and rotating at a higher rate of speed than that of said conveyers in a direction to engage the front end of an article adhering to said feeding means and smoothly to deliver it between said cooperating conveyers.

14. In a machine of the class described having means for feeding a series of articles, means for feeding a web of covering material, and means for severing therefrom sections complementary to predetermined portions of said articles and applying said sections thereto comprising a feeding and applying cylinder for said covering material, a plurality of spaced cutting members on said cylinder, a cutter-carrying member having a plurality of cutters positioned to cooperate with the respective cutting members of said cylinder, selectively operable to sever from said web sections of different size complementary to similar predetermined areas of said articles, and means for actuating said cutter-carrying member in synchronism with the cutting members of said cylinder.

15. In a machine of the class described having means for feeding a series of articles, means for feeding a web of covering material, means for severing therefrom sections complementary to predetermined portions of said articles and applying said sections thereto comprising a feeding and applying cylinder for said covering material, a plurality of spaced cutting members on said cylinder, a complementary cutter-carrying member, and means selectively operable to cause a cutter thereof to cooperate with a cutting member on said cylinder to sever from said web sections of different size complementary to similar predetermined areas of said articles, and means for actuating said cutter-carrying member in properly timed relation to the cutting member or members of said cylinder.

16. In a machine of the class described having a conveyer for feeding a series of articles having adhesive-coated portions, means for continuously feeding a web of flexible covering material and means for severing therefrom sections complementary to the adhesive-coated portions of said articles and applying said sections thereto comprising a feeding and applying cylinder for said flexible material, a plurality of suitably spaced cutting members on said cylinder, a rotatable cutter-carrying member having a plurality of knives positioned to cooperate with the respective cutting members of said cylinder, selectively operable to sever from said web sections of different size complementary to similar adhesive-coated sections of said articles, and means for continuously rotating said cylinder and said knife-carrying member at the same peripheral speed.

17. In a machine of the class described having means for feeding foundation material, means for feeding a web of covering material, means for severing therefrom sections complementary to predetermined areas of said covering material and applying said sections thereto comprising a feeding and applying cylinder for said covering material having a cutting member extending longitudinally thereof and presenting a cutting surface flush with the periphery of the cylinder, a cooperating traveling cutter-carrying member having a cutting blade adapted to engage the cutting member of said cylinder, and resilient clamping means associated with said cutting blade adapted to engage the web of material and clamp the same before and during the severing engagement thereof by said blade.

18. In a machine of the class described comprising a conveyer for a foundation material, means for applying an overlaying web of flexible material to and in registry with predetermined portions of said foundation material comprising a perforated cylinder continuously rotating in synchronism with the movement of the conveyer, auxiliary means for feeding a web of flexible material into engagement with said cylinder at a slower rate of speed than the peripheral speed of said cylinder, cutting means cooperating with said cylinder successively to sever sections of predetermined size from said web, means for progressively applying suction through the perforations in said cylinder to said web in advance of the cutting operation to cause said web to adhere to said cylinder with progressively increasing area and thereby to apply a smoothing tension to said web in advance of the severance of the section therefrom.

19. In a machine of the class described comprising a conveyer for a foundation material, means for applying an overlaying web of flexible material to and in registry with predetermined portions of said foundation material comprising a perforated cylinder continuously rotating in synchronism with the movement of the conveyer, auxiliary means for feeding a web of flexible material into engagement with said cylinder at a slower rate of speed than the peripheral speed of said cylinder, cutting means cooperating with said cylinder successively to sever sections of predetermined size from said web, means for progressively applying suction through the perforations in said cylinder to said web in advance of the cutting operation to cause said web to adhere to said cylinder with progressively increasing area and thereby to apply a smoothing tension to said web in advance of the severance of the section therefrom, and means for continuing the application of suction to the major portion of said web after the severance of the section therefrom.

20. In a machine of the class described comprising a conveyer for a foundation material, means for applying an overlaying web of flexible material to and in registry with predetermined portions of said foundation material comprising a perforated cylinder continuously rotating in synchronism with the movement of the conveyer, auxiliary means for feeding a web of flexible material into engagement with said cylinder at a slower rate of speed than the peripheral speed of said cylinder, cutting means cooperating with said cylinder successively to sever sections of predetermined size from said web, means for progressively applying suction through the perforations in said cylinder to said web in advance of the cutting operation to cause said web to adhere to said cylinder with progressively increasing area and thereby to apply a smoothing tension to said web in advance of the severance of the section therefrom, and adjustable means for controlling the position at which suction is applied through the perforations of said cylinder.

21. A machine of the class described comprising a conveyer for a foundation material, means cooperating with and traveling at the same rate as said conveyer for applying sections of overlaying material upon and in registry with predetermined portions of said foundation material, means for feeding a web of overlaying material at a slower rate of speed into slipping contact with said feeding and applying means to maintain a smoothing tension upon said web, cutting means cooperating with said feeding and applying means for severing sections from said web, means for advancing the speed of the web at the time of cutting, and means for relieving the tension upon the web during the time the speed thereof is advanced.

22. A machine of the class described comprising a continuously traveling conveyer for a foundation material, means cooperating with and traveling at the same rate as said conveyer for feeding and applying sections of overlaying material upon and in registry with predetermined portions of said foundation material, auxiliary means for feeding a web of overlaying material at a slower rate of speed into slipping contact with said feeding and applying means to maintain a smoothing tension upon said web, traveling cutting means cooperating with said feeding and applying means operable temporarily to clamp said web thereon and to sever said section therefrom in suitably timed relation to the movement of said applying means and said conveyer, guiding means for said web intermediate of said auxiliary feeding means and said feeding and applying means operable to prevent the application of undue tension to said web while it is clamped upon the more rapidly moving feeding and applying means.

23. In a machine of the class described having a conveyer for a foundation material and means cooperating therewith and traveling at the same rate as said conveyer for feeding, cutting and applying sections of overlaying material upon and in registry with predetermined portions of said foundation material, rotatable means for supporting a supply roll of said overlaying material, positively driven auxiliary feeding means for feeding the web of overlaying material to said feeding and applying means, and a yieldable take-up intermediate of said supply roll and said auxiliary feeding means operable upon starting of the machine gradually to overcome the inertia of the supply roll and thereby to avoid imposition of a breaking strain upon the web of overlaying material.

24. In a machine of the class described having continuously moving means for feeding a series of flat articles having adhesive-coated portions and continuously rotating means for feeding a web of flexible overlaying material, severing sections therefrom and applying said sections to the adhesive-coated portions of said articles, rotatable means for supporting a supply roll of said overlaying material, a pair of positively driven auxiliary feed rolls for said web intermediate of said supply roll and said feeding, severing and applying means, driven at a slower peripheral speed than that of said feeding, severing and applying means, and a yielding take-up intermediate of said supply roll and said auxiliary feed rolls operable upon starting of the machine gradually to overcome the inertia of the supply roll and thereby avoid imposition of a breaking strain upon the web of overlaying material.

25. A machine of the class described comprising a conveyer for a foundation material, means for applying an overlaying layer of flexible material to and in registry with predetermined portions of said foundation material comprising a perforated cylinder continuously rotating in synchronism with the movement of said conveyer, auxiliary means for continuously feeding a web of said flexible material into engagement with said cylinder, cutting means cooperating with said cylinder successively to sever sections of predetermined size from said web, means for applying suction through the perforations in said cylinder to said web in advance of the cutting operation to cause said web to adhere to said cylinder, and other means for applying suction through the perforations in said cylinder to the severed section of said web to cause it to adhere to said cylinder and thereby to bring it into registry with said predetermined portion of said foundation material.

26. A machine of the class described comprising a continuously traveling conveyer for a foundation material, means for applying adhesive to a predetermined portion thereof, means for applying an overlaying section of cellulosic material to and in registry with the adhesive-bearing portions of said foundation material comprising a perforated cylinder continuously rotating in synchronism with the movement of said conveyer, means for feeding a web of said cellulosic material into slipping engagement with said cylinder, cutting means cooperating with said cylinder successively to sever sections of predetermined size from said web, means for applying suction through the perforations in said cylinder to said web in advance of the cutting operation to cause said web to adhere to said cylinder, other means for applying suction through the perforations in said cylinder to the severed section of said web to cause it to adhere to said cylinder and thereby to bring it into registry with the adhesive-bearing portion of said foundation material.

27. A machine of the class described comprising a continuously traveling conveyer for a foundation material, means for applying adhesive to a predetermined portion thereof, means for applying an overlaying section of cellulosic material to and in registry with the adhesive-bearing portions of said foundation material comprising a perforated cylinder continuously rotating in synchronism with the movement of said conveyer, means for feeding a web of said cellulosic material into slipping engagement with said cylinder, cutting means cooperating with said cylinder to sever a section of predetermined size from said web, means for applying suction through the perforations in said cylinder in advance of the cutting operation to cause said web to adhere to said cylinder, other means for applying suction through said perforations to the severed section on said cylinder to cause it to adhere to said cylinder and thereby to bring it into accurate registry with the adhesive-bearing portion of said foundation material, and means for projecting air under pressure through the perforations in said cylinder beneath the severed section when it registers with said adhesive-bearing portion of the foundation material.

28. In a machine of the class described having a conveyer for a foundation material, means for feeding a flexible material and applying sections of the same in registry with predetermined portions of said foundation material comprising a continuously rotating cylinder having a perforated circumferential wall and also provided with a cutting instrumentality extending lengthwise of said peripheral wall, a complementary cutting member operable to sever sections of predetermined size from said web, means operable respectively to apply suction through said perforations to cause the web of flexible material to adhere to said cylinder before cutting and to cause the severed sections to adhere to said cylinder after severance from the web.

29. In a machine of the class described having a conveyer for a foundation material, means for feeding a web of flexible material and applying the same to said foundation material comprising a continuously rotating cylinder having a perforated circumferential wall, means for causing said web to adhere to said cylinder, means cooperating with said cylinder to sever from said web sections of a predetermined size, and means for projecting air under pressure through the perforations in said cylinder to detach the severed sections therefrom when in registry with predetermined portions of said foundation material.

30. In a machine of the class described having continuously moving means for feeding foundation material, means for feeding a web of flexible overlaying material, means for cutting sections therefrom and applying said sections to predetermined portions of said foundation material comprising a cylinder having a perforated circumferential wall and rotatably mounted upon a valve having chambers therein adapted to communicate with said perforations respectively in advance of cutting position and after cutting position to hold the severed section upon said cylinder until reaching registering position with the predetermined portions of the foundation material, and means for projecting air under pressure through said perforations when the section of overlaying material reaches registering position.

31. In a machine of the class described having a conveyer for a foundation material, means for feeding flexible overlaying material thereto, means for cutting sections therefrom and applying said sections to complementary sections of said foundation material comprising a rotating cylinder having a perforated circumferential wall divided by imperforate radial partitions into a longitudinal series of chambers, and means for selectively applying suction to such chambers of said cylinder as are required properly to hold the severed sections of overlaying material upon said cylinder until reaching registering position with the complementary sections of the foundation material.

32. In a machine of the class described having a continuously moving conveyer for feeding a series of flat foundation articles, means for feeding a web of flexible material and applying sections of the same in registry with predetermined portions of said articles comprising a continuously rotating cylinder having a perforated circumferential wall and also provided with a cutting instrumentality extending lengthwise of said peripheral wall, a complementary cutting member operable to sever sections of predetermined size from said web, means operable respectively to apply suction through said perforations to cause said web of flexible material to adhere to said cylinder before cutting and to cause the severed sections to adhere to said cylinder after severance from said web, and means for projecting air under pressure through said perforations when the severed sections are brought into registry with said predetermined portions of said articles.

33. A machine of the class described comprising a conveyer for a series of foundation articles, means for successively applying adhesive to a predetermined portion of each article, means for feeding a web of overlaying material, means for severing like sections therefrom during the feeding movement thereof, means for applying the severed sections to and in registry with the adhesive-bearing portions of said foundation articles, feeler mechanism positioned to engage the articles on said conveying means, and means operable thereby upon detection of absence of an article to separate said adhesive applying means from said conveyer.

34. A machine of the class described comprising a conveyer for a series of foundation articles, means for successively applying adhesive to a predetermined portion of each article, means for feeding a web of overlaying material, means for severing like sections therefrom during the feeding movement thereof, means for applying the severed sections to and in registry with the adhesive-bearing portions of said foundation articles, feeler mechanism positioned to engage the articles on said conveying means, means operable thereby upon detection of absence of an article to separate said adhesive applying means from said conveyer, and means operable by said feeler mechanism to remove the adhesive applying means from the means from which it receives the adhesive.

35. A machine of the class described having a traveling endless conveyer for a series of articles, means for applying a predetermined pattern of adhesive to the successive articles comprising a drum cooperating with said conveyer and having a raised adhesive-receiving pattern, means for coating said pattern with adhesive, movable means for positioning said drum to cause the pattern thereon to engage the successive articles and apply a pattern of adhesive thereto, means for applying a section of covering material to the adhesive coated area of the article, a feeler positioned to engage the traveling articles, and means operable upon detection by said feeler of the absence of an article to move said drum out of adhesive-applying position.

36. A machine of the class described having an endless conveyer for a series of articles, means for applying a predetermined pattern of adhesive to the successive articles comprising a drum cooperating with said conveyer and having a raised adhesive-receiving pattern, means for coating said pattern with adhesive, movable means for positioning said drum to cause the pattern thereon to engage the successive articles and apply a pattern of adhesive thereto, means for applying a section of covering material to the adhesive coated area of the article, a feeler positioned to engage the traveling articles, and means operable upon detection by said feeler of the absence of an article to move said drum out of adhesive-applying position with relation to said conveyer and also out of operative relation to the means for coating the pattern with adhesive.

37. In a machine of the class described having a traveling endless conveyer for a series of articles, means including a rotatable cylinder for feeding and applying a flexible covering material to predetermined portions of said articles and provided with a cutting member, a cutter carrier having a knife adapted to cooperate with the cutting member on said cylinder to sever sections of predetermined size from a web of said flexible material, means for actuating said conveyer, feeling means normally engaging the articles on said conveyer, and means operable by said feeling means upon detection of absence of an article from said conveyer to move said knife out of operative relation to the cooperating cutting member on said cylinder.

38. In a machine of the class described having a moving conveyer for a series of articles, a rotatable drum having means for applying adhesive successively to a portion of each article, a rotatable cylinder for feeding and applying a flexible covering material to the adhesive-coated portion of each article and provided with a cutting member, a rotatable cutter carrier having a knife adapted to cooperate with the cutting member on said cylinder to sever sections of predetermined size from a web of said flexible material, means for actuating said article-feeding means, said adhesive-applying means, said cylinder, and said cutter-carrying member in synchronism, and feeling means normally engaging the articles on said conveyer, and means operable respectively by said feeling means upon detection of absence of an article from said conveyer, to move the adhesive-applying means out of operative relation to the articles and to move the knife out of operative relation to said web.

39. In a machine of the class described having a continuously moving conveyer for a series of articles a rotatable drum having means for applying adhesive to a portion of each article, a rotatable cylinder for feeding and applying a covering material to the adhesive-coated portion of each article and provided with a cutting member and a rotatable cutter carrier having a knife adapted to cooperate with the cutting member on said cylinder to sever sections of predetermined size from the web of said covering material, means for actuating said article-feeding means, said adhesive-applying means, said cylinder and said cutter-carrying member in synchronism, auxiliary feed rolls operable to deliver the web of covering material to the feeding, cutting, and applying cylinder at a slower rate than that of the peripheral movement of said feeding, cutting, and applying cylinder, feeling mechanism normally engaging the articles on the said conveyer and means respectively operable by said feeling means upon detection of the absence of an article from said conveyer to raise the adhesive-applying means and the knife carrier respectively out of operative relation to said article and to said web, to separate said auxiliary feeding rolls from operative engagement with said web, and simultaneously to clamp said web, and means for restoring the aforesaid mechanisms to normal position upon engagement of the feeler with the succeeding article upon said conveyer.

40. In a machine of the class described having a conveyer for a series of articles, a rotatable cylinder for feeding and applying a covering material to a predetermined portion of each article and provided with a cutting member and a rotatable cutter carrier having a knife adapted to cooperate with the cutting member on said cylinder to sever sections of predetermined size from the web of said covering material, means for actuating said article-feeding means, said cylinder, and said cutter-carrying member in synchronism, means for supporting a supply roll of flexible material, a pair of positively driven auxiliary feed rolls intermediate of said supply roll and said feeding, cutting, and applying cylinder operative to deliver the web of covering material to said cylinder at a slower rate of speed than that of said cylinder, feeling means normally engaging the articles on said conveyer and means operable respectively by said feeling means upon detection of the absence of an article from said conveyer to move the knife carrier out of operative relation to said web, to separate said auxiliary feeding rolls from operative engagement with said web, and to brake the rotation of said supply roll.

41. In a machine of the class described having means for supplying covering sections of overlaying material to predetermined portions of a foundation material, means for conveying said foundation material to said applying means comprising an endless perforated belt having its upper lead extending beneath said covering applying means, a plurality of suction chambers extending longitudinally of and beneath the upper lead of said belt and communicating with the perforations therein, means for adjusting said suction chambers laterally relatively to each other, means for exhausting the air from said suction chamber to cause the foundation material to adhere to said belt, and means for actuating said conveyer belt in timed relation to said covering applying means.

42. In a machine of the class described for accurately applying sections of covering material to predetermined areas of flat articles, rotatable means for applying a predetermined pattern of adhesive to each of said articles, means for applying a complementary section of covering material to the adhesive-coated area of said article, and means for presenting said articles successively first to said adhesive-applying means and then to said covering-applying means, comprising an endless perforated belt having its upper lead extending beneath said adhesive-applying means and said covering-applying means, a suction chamber, extending longitudinally of and beneath the upper lead of said belt and communicating with the perforations therein, means for exhausting the air from said suction chamber to cause said articles to adhere to said belt, and means for actuating said conveyer belt in timed relation to the rotation of said adhesive-applying means and said covering-applying means.

43. In a machine of the class described means for applying a pattern of adhesive to a predetermined portion of the foundation material, means for applying covering sections of overlaying material to said predetermined portions of said foundation material an endless perforated belt having its upper lead extending beneath said adhesive-applying means and said covering-applying means, parallel suction chambers suitably spaced apart extending longitudinally of and beneath the upper lead of said belt and communicating with the perforations therein, means for exhausting the air from said suction chambers to cause said articles to adhere to said belt, and means for actuating said conveyer belt in timed relation to the rotation of said covering-applying means.

44. In a machine of the class described means for applying a pattern of adhesive to a predetermined portion of the foundation material, means for applying covering sections of overlaying material to said predetermined portions of said foundation material an endless perforated belt having its upper lead extending beneath said adhesive-applying means and said covering-applying means, parallel suction chambers suitably spaced apart extending longitudinally of and beneath the upper lead of said belt and communicating with the perforations therein, means for exhausting the air from said suction chambers to cause said articles to adhere to said belt, means for actuating said conveyer belt in timed relation to the rotation of said covering-applying means, and means for adjusting said suction chambers laterally of and in parallelism with the longitudinal axis of said conveyer belt.

45. In a machine of the class described means for successively applying a predetermined pattern of adhesive to each of a series of flat articles, means for applying sections of covering material to the adhesive-coated portions of said article, an endless perforated belt having its upper lead extending beneath said adhesive-coating means and said covering-applying means, parallel suction chambers suitably spaced apart extending longitudinally of and beneath the upper lead of said belt and communicating with the perforations therein, means for exhausting the air from said suction chambers to cause said articles to adhere to said belt, and means for actuating said conveyer belt in timed relation to the rotation of said adhesive-applying means and said covering-applying means.

46. In a machine of the class described means for successively applying a predetermined pattern of adhesive to each of a series of flat articles, means for applying sections of covering material to the adhesive-coated portions of said article, an endless perforated belt having its upper lead extending beneath said adhesive-coating means and said covering and applying means, narrow parallel suction chambers suitably spaced apart extending longitudinally of and beneath the upper lead of said belt and communicating with the perforations therein, means for exhausting the air from said suction chambers to cause said articles to adhere to said belt, means for actuating said conveyer belt in timed relation to the rotation of said adhesive-applying means and said covering applying means, and means for adjusting said suction chambers laterally of and in parallelism with the longitudinal axis of said conveyer belt.

47. In a machine of the class described means for successively applying a predetermined pattern of adhesive to each of a series of flat articles, rotatable means for applying covering sections of flexible material to the adhesive-coated portions of said article, an endless perforated belt having its upper lead extending beneath said adhesive-coating means and said covering and applying means, a suction chamber, extending longitudinally of and beneath the upper lead of said belt and communicating with the perforations therein, a series of guide rolls below and engaging the upper lead of said conveyer operable to prevent sagging of the belt, means for exhausting the air from said suction chamber to cause said articles to adhere to said belt, and means for actuating said conveyer belt in timed relation to the rotation of said adhesive-applying means and said covering applying means.

48. In a machine of the class described means for successively applying a predetermined pattern of adhesive to each of a series of flat articles, rotatable means for applying covering sections of thin material to the adhesive-coated portions of said article, an endless perforated belt having its upper lead extending beneath said adhesive-coating means and said covering and applying means, a suction chamber, extending longitudinally of and beneath the upper lead of said belt and communicating with the perforations therein, means for exhausting the air from said suction chamber to cause said articles firmly to adhere to said belt, means for actuating said conveyer belt in timed relation to the rotation of said adhesive-applying means and said covering applying means, and positively driven belt-tightening means engaging the lower lead of said conveyer belt operable to prevent slippage of the belt.

49. In a machine of the class described, having continuously moving means for feeding a series of flat articles and continuously rotating means for feeding a web of covering material, means for severing sections therefrom and applying said sections to predetermined portions of said articles, and rotatable means for supporting a supply roll of said covering material, a pair of positively driven auxiliary feed rolls for said web intermediate of said supply roll and said feeding, severing, and applying means, means for driving said auxiliary feed rolls at a slower peripheral speed than that of said feeding, severing, and applying means, and means for adjusting the speed of rotation of said auxiliary feed rolls during the operation of the machine whereby the length of the section severed from the web of covering material may be varied.

50. In a machine of the class described having means for feeding a foundation material, means for applying a covering material to said foundation material, and controlling means automatically operable to vary the relative rates of movement of the feeding means for the foundation material and the covering-applying means to maintain registry of predetermined areas of said foundation material and said covering material.

51. In a machine of the class described comprising a conveyer for foundation material, means for applying sections of covering material to predetermined portions of said foundation material comprising a feeding and applying cylinder having narrowly spaced perforations extending through its wall and provided at the outer end with enlarged recesses through which suction may be applied to the major portion of the area of covering material which contacts with the periphery of the cylinder.

52. In a machine of the class described comprising a conveyer for a foundation material, means for applying a covering of flexible cellulosic material to predetermined portions of said foundation material comprising a continuously rotating perforated feeding and applying cylinder cooperating with said conveyer, auxiliary feeding means for delivering a web of covering material to said cylinder at a slower rate of speed than the peripheral speed of said cylinder to cause slipping engagement therewith, means for applying suction progressively through the perforations of said cylinder to said web, the periphery of said cylinder presenting a surface to engage said covering material which will greatly minimize the static electricity produced by the friction between the cylinder and the overlaying material.

53. In a machine of the class described comprising a conveyer for a foundation material, means for applying a covering of flexible cellulosic material to predetermined portions of said foundation material comprising a continuously rotating perforated feeding and applying cylinder cooperating with said conveyer, auxiliary feeding means for delivering a web of covering material to said cylinder at a slower rate of speed than the peripheral speed of said cylinder to cause slipping engagement therewith, means for applying suction progressively through the perforations of said cylinder to said web, said cylinder being provided with a covering of reticulated material adapted to minimize the static electricity produced by the friction between the cylinder and the overlaying material.

54. A machine of the class described for applying sections of thin overlaying material to predetermined portions of foundation material comprising a conveyer for said foundation material, means for actuating the same, a feeding and applying cylinder cooperating with said conveyer, means for rotating said cylinder at the same peripheral speed as the speed of said conveyer, auxiliary means for feeding a web of said overlaying material to said cylinder at a slower speed than the peripheral speed of said cylinder to cause slipping engagement therewith, a cutter carrier, cooperating pinch-cutting means respectively on said cutter carrier and on the periphery of said cylinder operable completely to sever sections from said web, and means for actuating said cutter carrier in coordinated relation to said cylinder to produce sections of overlaying material of predetermined width.

55. A machine of the class described for applying sections of thin overlaying material to predetermined portions of foundation material comprising a conveyer for said foundation material, means for actuating the same, a feeding and applying cylinder cooperating with said conveyer, means for rotating said cylinder at the same peripheral speed as the speed of said conveyer, auxiliary means for feeding a web of said overlaying material to said cylinder at a slower speed than the peripheral speed of said cylinder, cutting means cooperating with said cylinder to completely sever sections from said web, and means to allow said web to be drawn forward at a faster rate of speed than the normal rate of speed of said web to said cylinder during the cutting operation.

56. A machine of the class described for applying sections of thin overlaying material to predetermined portions of foundation material comprising a conveyer for said foundation material, means for actuating the same, a feeding and applying cylinder cooperating with said conveyer, means for rotating said cylinder at the same peripheral speed as the speed of said conveyer, auxiliary means for feeding a web of said overlaying material to said cylinder at a slower speed than the peripheral speed of said cylinder to cause slipping engagement therewith, means for causing the cylinder-engaged portion of the web to adhere to said cylinder, a cutter carrier, cooperating cutting means respectively on said cutter carrier and on the periphery of said cylinder operable to completely sever sections from said web, means for actuating said cutter carrier in coordinated relation to said cylinder to produce sections of overlaying material of predetermined size, and means for allowing the portion of the web between said auxiliary feeding means and said cylinder to be drawn forward at a faster rate of speed than the normal rate of speed produced by said auxiliary feeding means during the cutting operation, thereby to avoid tearing of said thin material.

57. A machine of the class described comprising means for applying sections of thin cellulosic material to predetermined portions of foundation material comprising a conveyer for said foundation material, means for actuating the same, a feeding and applying cylinder cooperating with said conveyer, means for actuating said cylinder at the same peripheral speed as the speed of said conveyer, auxiliary feeding means for delivering a web of said cellulosic material to said cylinder at a slower speed than the peripheral speed of said cylinder to cause slipping engagement therewith, whereby static electricity produced by said slipping action will cause adherence of said web to said cylinder, cutting means cooperating with said cylinder to sever sections of predetermined size from said web, and means for allowing the portion of the web between said auxiliary feeding means and said cylinder to be drawn forward at a faster rate of speed than the normal rate of speed produced by said auxiliary feeding means in advance of and during the cutting operation thereby to avoid tearing or shattering of the cellulosic material.

58. A machine of the class described for applying sections of thin overlaying material to predetermined portions of foundation material comprising a conveyer for said foundation material, means for actuating the same, a feeding and applying cylinder cooperating with said conveyer, means for rotating said cylinder at the same peripheral speed as the speed of said conveyer, auxiliary means for feeding a web of said overlaying material to said cylinder at a slower speed than the peripheral speed of said cylinder to cause slipping engagement therewith, means for applying suction through the periphery of said cylinder in advance of and during the cutting operation, cutting means cooperating with said cylinder to sever sections of predetermined size from said web, means for applying suction through the periphery of said cylinder to said web in advance of and during the cutting operation, and means for allowing the portion of the web between said auxiliary feeding means and said cylinder to be drawn forward at a faster rate of speed than the normal rate of speed produced by said auxiliary feeding means during the cutting operation.

59. In a machine of the class described comprising means for forwarding foundation material, means for applying adhesive to predetermined areas of said foundation material, means for applying a covering of flexible material to and in registry with said predetermined areas comprising a perforated suction cylinder continuously rotating in synchronism with the movement of said foundation-forwarding means, auxiliary means for feeding a web of said flexible material into engagement with said cylinder at a slower rate of speed than the peripheral speed of said cylinder, cutting means operable to sever sections of predetermined size from said web, means for progressively applying suction through the perforations in said cylinder to said web in advance of the cutting operation to cause said web to adhere to said cylinder with progressively increasing area and thereby to apply a smoothing tension to said web in advance of the severance of the sections therefrom.

60. In a machine of the class described, means for forwarding a series of foundation articles, means for applying adhesive to predetermined areas of said foundation material, means for applying a covering of flexible material to said predetermined areas comprising a perforated suction cylinder rotating in synchronism with the movement of said means for feeding the foundation articles, auxiliary means for feeding a web of flexible material into engagement with said cylinder at a slower rate of speed than the peripheral speed of said cylinder to cause slipping engagement therewith, cutting means for severing sections of predetermined size from said web, and means for applying suction through the perforations in said cylinder to said web in advance of and after the cutting operation to cause the section of flexible material to adhere thereto and after severance to assume the speed of the cylinder.

61. In a machine of the class described, means for forwarding a series of foundation articles, means for applying adhesive to predetermined areas of said foundation material, means for applying a covering of flexible material to said predetermined areas comprising a perforated suction cylinder rotating in synchronism with the movement of said means for feeding the foundation articles, auxiliary means for feeding a web of flexible material into engagement with said cylinder at a slower rate of speed than the peripheral speed of said cylinder to cause slipping engagement therewith, cutting means for severing sections of predetermined size from said web, means for applying suction through the perforations in said cylinder to said web in advance of and after the cutting operation to cause the section of flexible material to adhere thereto and after severance to assume the speed of the cylinder, means for releasing the suction applied to said web, and means for projecting air under pressure through said perforations to detach the severed sections therefrom when in registry with said predetermined adhesive-coated areas of the foundation material.

62. In a machine of the class described comprising means for continuously forwarding substantially flat foundation material, means for applying adhesive to predetermined areas of said foundation material, a suction cylinder having a perforated surface continuously rotating in synchronism with the movement of said foundation-forwarding means, means for applying suction through the perforations of said cylinder, adjustable means for feeding predetermined variable lengths of a web of covering material to said cylinder at a slower rate of speed than the peripheral speed of said cylinder, means for cutting from the web sections of said predetermined lengths, the end of said web being held after severance by suction upon said faster traveling cylinder while a previously cut section is being rolled by said cylinder into contact with an adhesive-coated area of said traveling foundation material, and means for releasing the suction upon the severed section as it is applied to said foundation material.

LEON E. LA BOMBARD.